(12) United States Patent
Kannan et al.

(10) Patent No.: US 8,336,024 B2
(45) Date of Patent: Dec. 18, 2012

(54) EXTRACTING ONTOLOGICAL INFORMATION FROM SOFTWARE DESIGN DATA

(75) Inventors: Kalapriya Kannan, Bangalore (IN); Biplav Srivastava, Noida (IN); Vikas Agarwal, Noida (IN); Sumit Mittal, Uttar Pradesh (IN); Girish Bhimrao Chafle, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1440 days.

(21) Appl. No.: 11/937,041

(22) Filed: Nov. 8, 2007

(65) Prior Publication Data

US 2009/0125872 A1   May 14, 2009

(51) Int. Cl.
*G06F 9/44* (2006.01)
(52) U.S. Cl. .................. 717/107; 717/108; 717/111
(58) Field of Classification Search .............. None
See application file for complete search history.

(56) References Cited

U.S. PATENT DOCUMENTS

| | | | |
|---|---|---|---|
| 6,847,974 B2 | 1/2005 | Wachtel | |
| 7,685,140 B2 * | 3/2010 | Jackson | ............ 707/999.1 |
| 2006/0136428 A1 | 6/2006 | Syeda-Mahmood | |
| 2006/0156253 A1 | 7/2006 | Schreiber et al. | |

* cited by examiner

*Primary Examiner* — Chuck Kendall
(74) *Attorney, Agent, or Firm* — Gibb & Riley, LLC

(57) ABSTRACT

A method, computer System and computer program product for generating ontological information from design data are disclosed. The design data has a plurality of classes, the classes having at least one association with another class. The design data is processed on the basis of rules to identify environmental artifacts. The design data is processed on the basis of rules to identify implementation artifacts. All classes that are implementation artifacts are eliminated from the design data. New associations for non-eliminated design data that have broken class associations as a result of the elimination are established. The design data remaining following the elimination is processed to preserve environmental artifact relationships between the retained classes to generate an ontology.

16 Claims, 22 Drawing Sheets

Approach 1: Propogation

Case 1: No Outgoing Link

Case 3: Propagation Links

Case 2: No Incoming Link

EXTRACTING ONTOLOGICAL INFORMATION FROM SOFTWARE DESIGN DATA

FIELD OF THE INVENTION

The invention relates to the field of software development, and particularly to extracting ontological information from software design data created during software development.

BACKGROUND

Software reuse is a critical problem for Information Technology businesses involved with the development of custom software solutions. Most organizations build software solutions for focused markets, also called business lines, verticals or domains, and they seek to grow their expertise with every project. In a typical software development project, the project requirements are collected, and then the solution is developed and tested with the use of design data—typically in diagrammatic form—and ultimately released to the customer. At the end of the project, a report is generated to capture the learning. However, it is rare that project-end deliverables or reports are explicitly used to improve the solution development process for new projects.

One way in which the learning can be captured is by use of ontologies. An ontology is a data model that represents a domain of interest, and is used to reason about the objects in that domain and the relationships between them. Ontology focuses on both providing and expressing attributes and rich relationships among entities in the domain of interest. In other words, ontology is the explicit specification of conceptualization. Ontologies usually describe the set of entities and relationships among them by these elements: (a) individuals (instances), (b) classes (concepts), (c) attributes, and (d) relations.

SUMMARY

It is an object of the present invention to generate an ontology from design data that captures an understanding of a domain, and can be usefully reused in other software development projects within that domain.

A method, computer system and computer program product for generating ontological information from design data are disclosed. The design data has a plurality of classes, the classes having at least one association with another class. The design data is processed on the basis of rules to identify environmental artifacts. The design data is processed on the basis of rules to identify implementation artifacts. All classes that are implementation artifacts are eliminated from the design data. New associations for non-eliminated design data that have broken class associations as a result of the elimination are established. The design data remaining following the elimination is processed to preserve environmental artifact relationships between the retained classes to generate an ontology.

A method, computer system and computer program product for generating ontological information from UML design data are disclosed. The design data has a plurality of classes, each class having at least one association with another class, and each association having at least one attribute. The design data has a sequence of execution of the classes. The class data is processed to identify classes having an implementation artifact, and such classes are eliminated from said class data. A new association for non-eliminated classes having a dangling association as a result of the elimination of class data is created. The newly associated design data is processed with the sequence of execution data to preserve environmental relationships.

Other aspects are disclosed.

DETAILED DESCRIPTION

Figure 1:
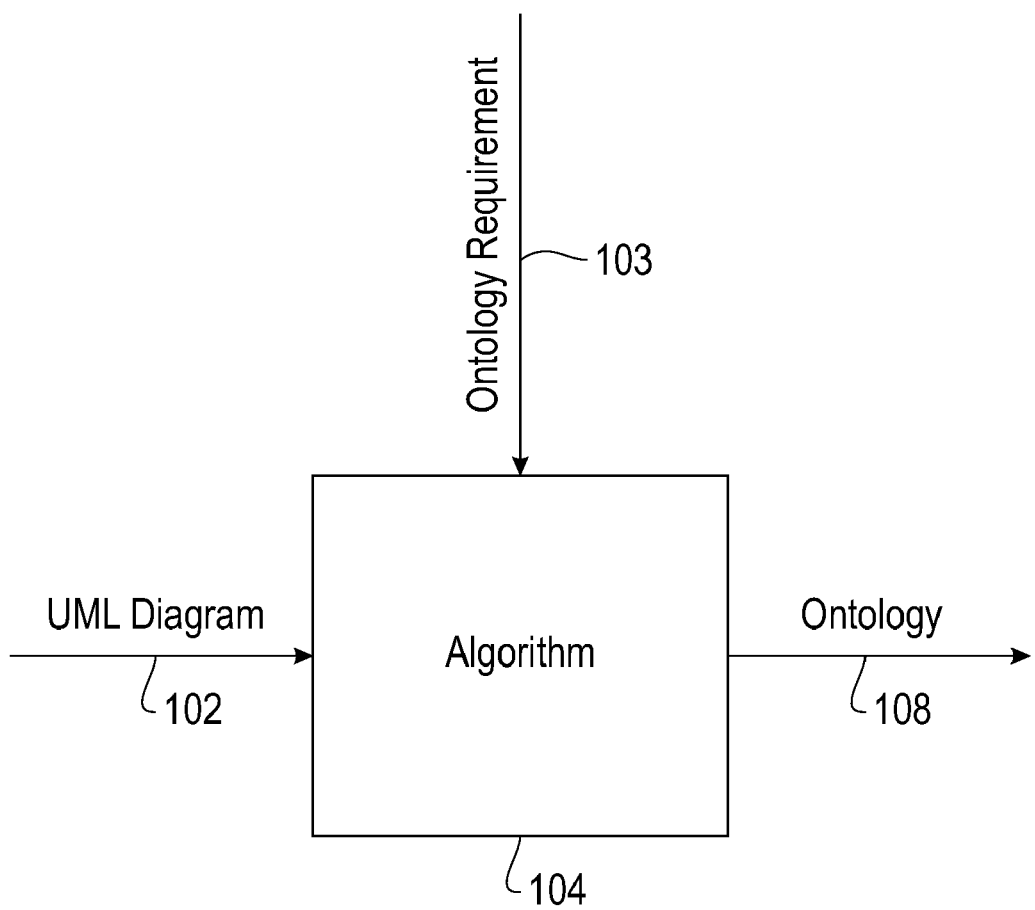
FIG. 1 is a schematic block diagram of a process embodying an aspect of the invention.

Method, system and computer program products for extracting ontological information from software design data are described. In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Terms which are used in the disclosure which correspond to the terminologies in the Design Diagram and Ontology literature are presented in Table 1.

TABLE 1

|  | Expressed in Design Diagram as (e.g. UML): | Expressed in Ontology as (e.g., OWL): |
|---|---|---|
| Entities | Classes | Concepts |
| Relationships | Generalization, IS-A | Subsumption, IS-A |
|  | Aggregation: HAS-A | Meronymy: part-of |
|  | Aggregation: composition | Meronymy: part-of property |
|  | Association |  |
| Property | Property | Property |

Unified Modeling Language (UML)

UML (www.omg.org) is a standard modeling language for specifying, constructing, visualizing and documenting artifacts of a software system. UML consists of nine sets of diagrams to model various software artifacts. These are: class diagrams, object diagrams, sequence diagrams, activity diagrams, package diagrams, component diagrams, deployment diagrams, collaboration diagrams, and use case modeling.

Class diagrams represent static model of different components of the software solution. Object diagrams provide a snapshot of execution. Collaboration diagrams bring forward collaboration between different objects, while the activity and state chart diagrams display sequence of activities and different states of the components respectively. Package and deployment diagrams give the modules and actual physical entities that hold the modules. The component diagram identifies the components in the design, use case models and the related boundary conditions.

There are two broad types of behavioral data within UML software: static information and dynamic (runtime) information. Class, package, component and deployment diagrams give static information about the software system, while the remainder (i.e., object, sequence, activity, collaboration and use case diagrams) give dynamic information. In one embodiment, class diagrams are chosen from the first category, and sequence diagrams are chosen from the second category.

In each UML diagram, implementation and environmental artifacts will be present. Incidentally, this is true also for modeling languages apart from UML.

Implementation artifacts capture low-level details of the software design, such as fields of messages exchanged and operation behavior. Typically, implementation artifacts vary from one project to another depending on implementation details such as programming language and middleware. Environmental artifacts capture information relevant across projects. Such information represent ontological entities and relationship among such entities. Implementation and environmental artifacts can be identified by rules (also known as heuristics).

The ontology uses the following elements to express environmental artifacts:

1. Individuals: Individuals in ontology may include concrete objects such as people, animals, tables, automobiles, molecules, and planets, as well as abstract individuals such as numbers and words. Strictly speaking, ontology need not include any individuals, but one of the general purposes of ontology is to provide a means of classifying individuals, even if those individuals are not explicitly part of the ontology.
2. Classes: They represent general entities in a domain of interest sharing common properties. One can define classes that may have multiple subclasses and super classes, and can define properties for these classes. Concepts in a domain are represented by classes.
3. Attributes: Objects in the ontology can be described by assigning attributes to them. Each attribute has at least a name and a value, and is used to store information that is specific to the object it is attached to.
4. Relationships: Describes the relationships that can exist among classes. Typically a relation is an attribute whose value is another object in the ontology.

A relationship can be classified into: (a) "subsumption", also known as IS-A relationship, defined as a premise of a deductive reasoning in which a conclusion is derived from two premises, such as a statement that is assumed to be true and from which a conclusion can be drawn, and (b) "meronymy", which is a semantic relation that holds a part and a whole, also known as PART-OF. In ontology 'Property' is a first class concept and does not belong to a particular class. This makes it important to specify restrictions correctly. By ascribing a domain to a property the usage of a property is restricted.

Environmental artifacts thus reflect concepts and relationships, and are of interest from an ontological view. Implementation artifacts, on the other hand, are solely meant to aid implementation, and thus are not of interest ontologically.

As mentioned previously, an implementation artifact is introduced for purpose of easing implementation. An implementation artifact can be of the form 'storage elements (like variable)' or 'controller elements (like controller classes)' Therefore, implementation artifacts can be classified as class-level artifacts and attribute-level artifacts.

Class Level Artifacts:

UML defines three types of classes (a) Boundary (b) Control and (c) Entity Classes(http://www-1.ibm.com/support/docview.wss?uid=swg21199365). Stereotypes (e.g. designer-specified annotation) are used to distinguish this information. A boundary class models the interaction between the software system and the environment. It models communication between the system's environments and its inner workings. A control class acts as coordinators of activity. The entity class models information that has been stored by the system and its associated behavior. It typically defines a set of entity objects, which participate in several use-cases and typically survive those use-cases. The boundary and controller classes described above are used to co-ordinate the activities (implementation artifact) of the system while the entity classes are used to perform task internal to the system. By and large the entity classes reflect a real world entity. From the foregoing discussion on classification of the classes it can be noted that boundary and controller classes are implementation artifact (introduced to ease software development) while entity classes are used to model environmental artifacts (real world objects and their relationships).

Attribute Level Artifacts

Attributes are storage elements of the value of a class instance. They define the state of an instance of a class. Implementation artifacts are also introduced at the levels of attributes in a class. While some attributes are used to store instance values that reflect the property of the entity class, other attributes are used for the purpose of introducing uniqueness or maintaining class level state or for providing identity to entities. These attributes are either required to store values that are a result of computation(s) or used for other computations. The second category of variable is implementation artifacts.

In what follows, constitutes of an environmental artifact and an implementation artifact has been defined for UML diagrams.

Generating Ontological Data from Design Data

FIG. 1 is a schematic block diagram showing the broad process 100 of one aspect of the invention. UML diagrams 102 are input to an algorithm 104. Concepts of interest can be specified with an ontology requirement 106, expressed as a tuple, e.g., $C_a$, $C_b$, as input to the algorithm 104. The algorithm 104 generates an ontology 108 as an output, that captures the design data expressed by the UML diagrams 102.

Figure 2:
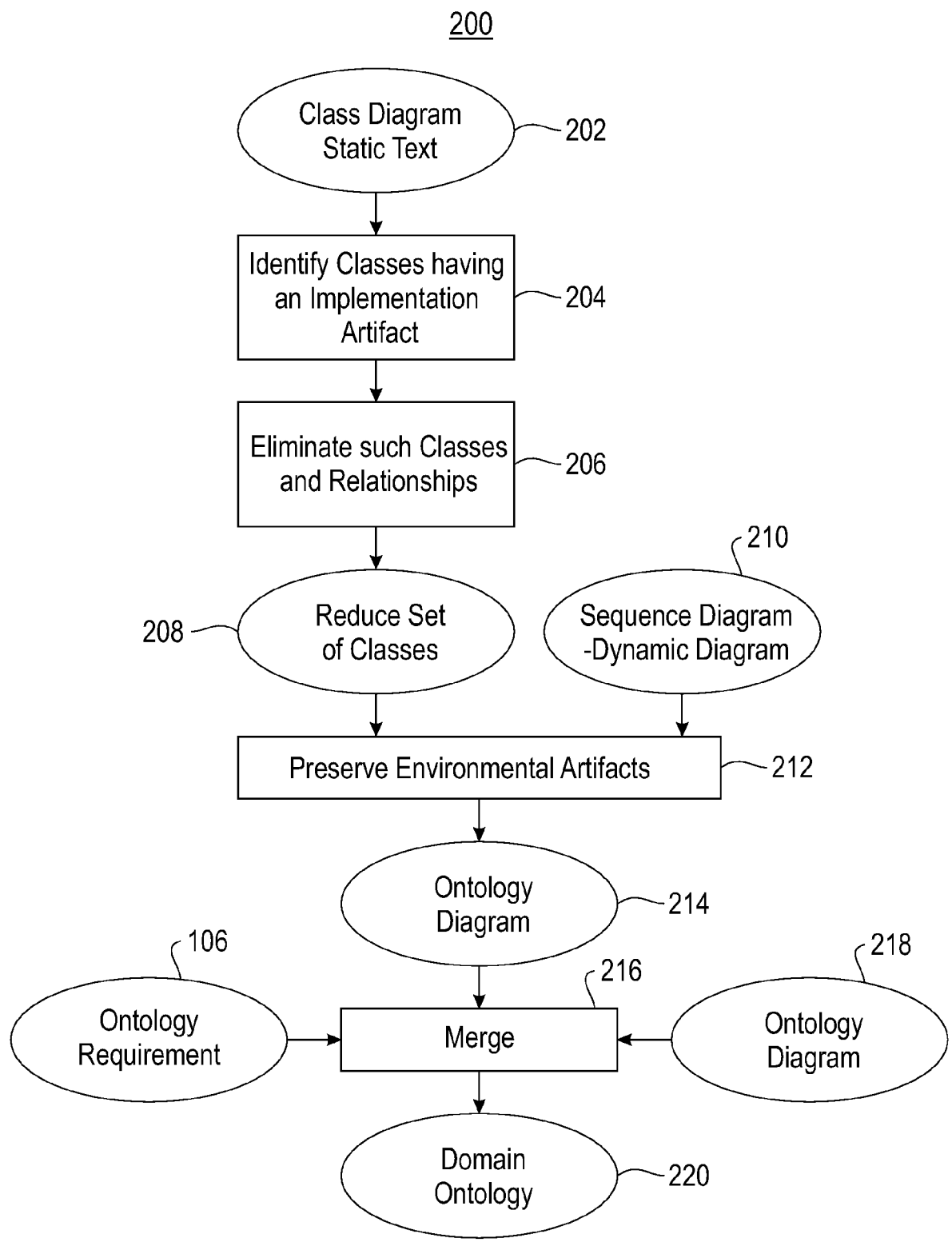
FIG. 2 is a block flow diagram of the algorithm of FIG. 1.

FIG. 2 is a block flow diagram 200 of the algorithm 104 of FIG. 1. The process flow begins with a class diagram 202 (representing one form of static design data). The class diagram 202 is processed in step 204 to identify classes having implementation artifacts. In step 206, such identified classes are eliminated, and any 'dangling' or 'broken' relationships with other classes are reformed. There thus is formed a reduced set of classes 208. A sequence diagram 210 for the design data—representing a form of dynamic data—also is utilized, along with the reduced set of classes in 208, to preserve the environmental relationships in step 212. The output of step 212 is an ontology diagram 214 for the input design data 202, 210. Next, in step 216, an ontology requirement 106 is merged with the ontology diagram 214 and one or more other ontology diagrams 218, to produce a domain ontology 220.

UML Class and Sequence Diagrams

The data structure representing the chosen UML class diagram and sequence diagram is described below. To represent different relationships in a class diagram, different data structures are used individually for each relationship. The generic data structure is a graph representing the UML class diagram. All classes in the class diagrams are represented as nodes in the graph and the associations between the classes are represented as edges. The label conversion converts a class name to a label name for a node and for an edge.

Each association has the following attributes: name, role names, direction, cardinality constraints and OCL constraints. (It is not mandatory that each link should have all the attributes.) The edge in the graph inherits all these attributes.

Inheritance, Aggregation and Composition Relationships

Inheritance, Aggregation and Composition Relationships are represented as a Directed Acyclic Graph (DAG). An inheritance relationship from class A to Class B (A is a specialization of B) is represented as a directed edge from a node A (that represents class A) to node B (that represents class B). This implies A is derived from B. Similarly, aggregation and composition relationship between class A and class B (Class A HAS-A relationship with Class B), is represented by a directed edge from a node A to node B.

USING Relationship

Bidirectional and directed links in the class diagram are represented either as a directed edge or bidirectional edge in the graph.

The node names are prefixed by the stereotypes followed by the names of the classes. The edges are prefixed to reflect the nature of the association. The directed edges representing the directed links are differentiated from the directed links representing inheritance, aggregation or composition relation by the prefix of the label on the edges. The directed links in the class diagram are prefixed with DIRECTED, bidirectional edges names are prefixed with BI. An edge representing the inheritance, aggregation and composition has prefix INHERIT, AGGRE, COMPOSE.

Notation

In the example that follows, the following notation is adopted.
E—Node to be eliminated.
$C_a$—Candidate Class.
$IG_i$—Inheritance graph in $i^{th}$ class diagram.
$e^i$—$i^{th}$ edge in the graph. This is an association in the class diagram.
$e_{ij}$—represents the new edge that is formed by the dangling edges $de_i$ and $de_j$.
$de_i$—$i^{th}$ dangling edge in the graph.

Association represents any relationship between two classes and link represents this association in the Object diagram. Object Diagram depicts the interaction among instances of the class. Edges, links and associations are used interchangeably and its meaning is implicitly from the context in which it is used.

Properties and Attributes of UML elements can be used interchangeably. They have the same meaning.

Node A has an outgoing link to Node B when it has a USING relationship with Node B (node A uses node B). Node A has an incoming link from Node B when Node B uses node A.

Ancestors for a node A, in the context of inheritance, implies all the nodes that are generalization of node A. Descendants for a node A, in the same context, implies all nodes that are derived from node A.

Elimination of Class-Level Implementation Artifacts

At the class level, Controller and Boundary classes are considered by the application of rules to be implementation artifacts. The rule applied is that boundary classes define the interface of the software and controller classes define the control flow, both of which are implementation level details.

The elimination of a controller/boundary class has two consequences: (a) it affects those nodes that have aggregation, composition and inheritance relationship with the node that is eliminated, and (b) it leaves dangling edges among its neighbors having a USING relationship.

Nodes that are related to the eliminated node, through inheritance, composition and aggregation are also eliminated. A node that has IS-A and HAS-A relationships with another node will cease to exist on elimination of this node.

The preservation of the relationship (dangling edges) among the neighbors (for the nodes that are eliminated) is achieved by the process of propagation. Propagation implies maintaining new relationship among the neighbors after removing a node. This involves identifying the properties that would characterize the new link among the neighbors.

Propagation connects the dangling edges that were previously connected to the node that has been removed. Note that there will be no dangling edge representing inheritance, aggregation or composition, since the nodes that are connected to E through any of these relationships also are removed. Connecting the dangling edges results in new edges created among neighbors. The properties of the new edge depend upon the properties of the two edges that are to be merged to create this new edge. The general properties (attributes) of the link are examined, and these properties are created for the new edge (i.e., new values for these properties).

Figure 3A:
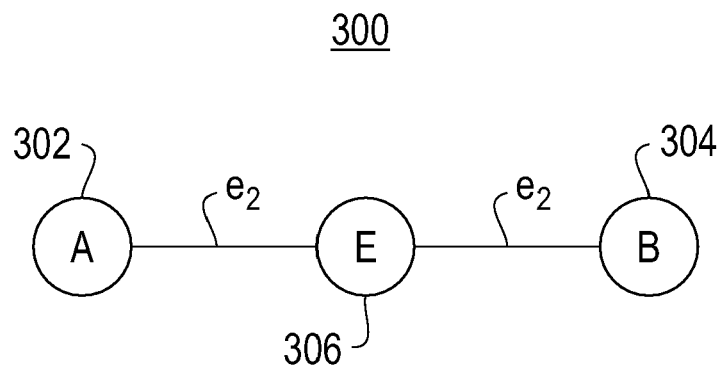
FIGS. 3A and 3B are schematic diagrams of nodes and node edges.
Figure 3B:
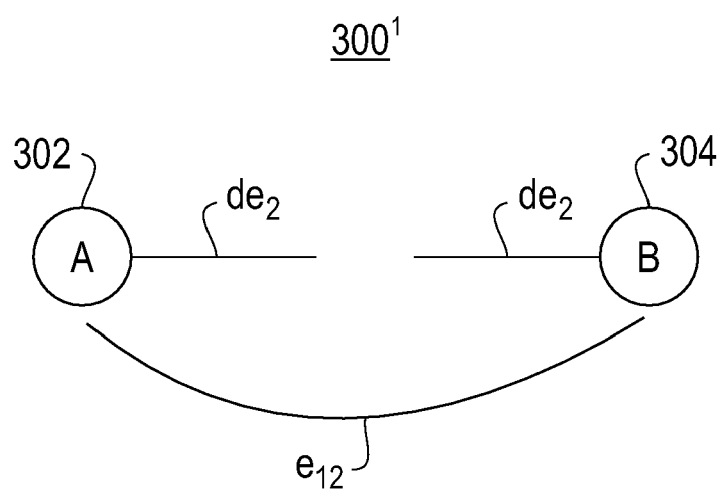

A DAG 300 is shown in FIG. 3A, where node A 302 and node B 304, have a repsective edge $e_1$ and $e_2$ with node E 306. If node E 306 is removed, then dangling edges will exist. FIG. 3B shows the resultant DAG 300' dangling edges $de_1$ and $de_2$, and a new edge $e_{12}$ that is formed. This connection is achieved by identifying Propagating Edges.

Figure 4A:
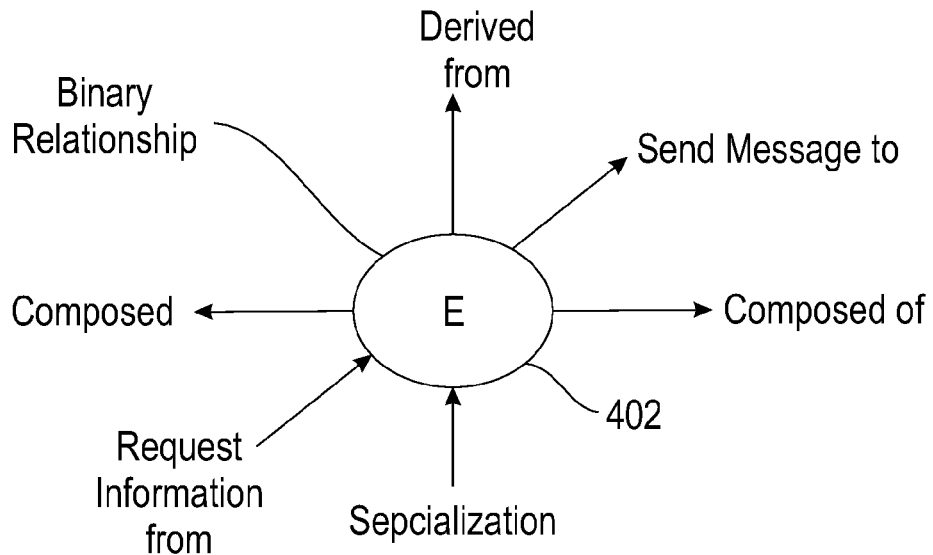
FIGS. 4A and 4B are schematic diagrams of different forms of edge ends at nodes.
Figure 4B:
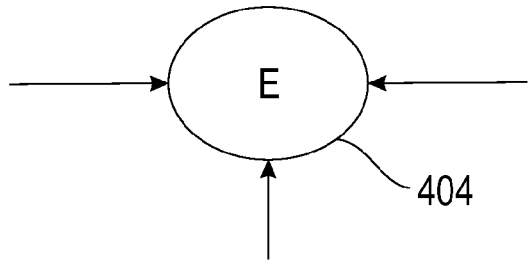
Figure 4B:
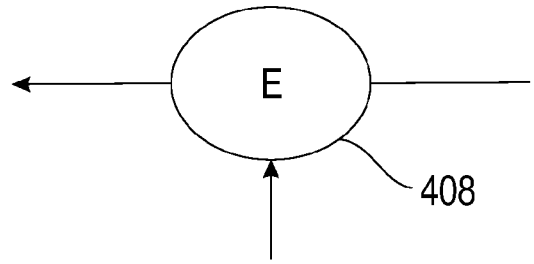
Figure 4B:
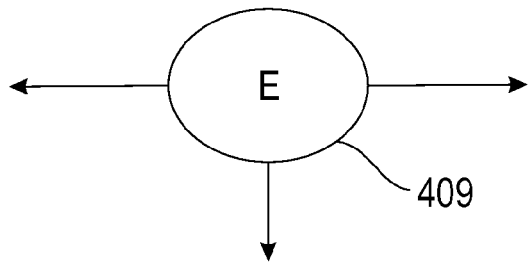

Propagating edges are those edges $e_i$ ($de_i$ after removal of node E) that contribute to new edges $e_{ij}$. FIG. 4A shows the different types of edge end possible at the node E 402. In FIG. 4B, Case 1 and Case 2 (only incoming and outgoing links to repsective node E 404, 406) do not have propagating edges. Case 3 is of interest, however, as node E 408 having propagating edges (i.e., incoming and outgoing links).

Figure 5:
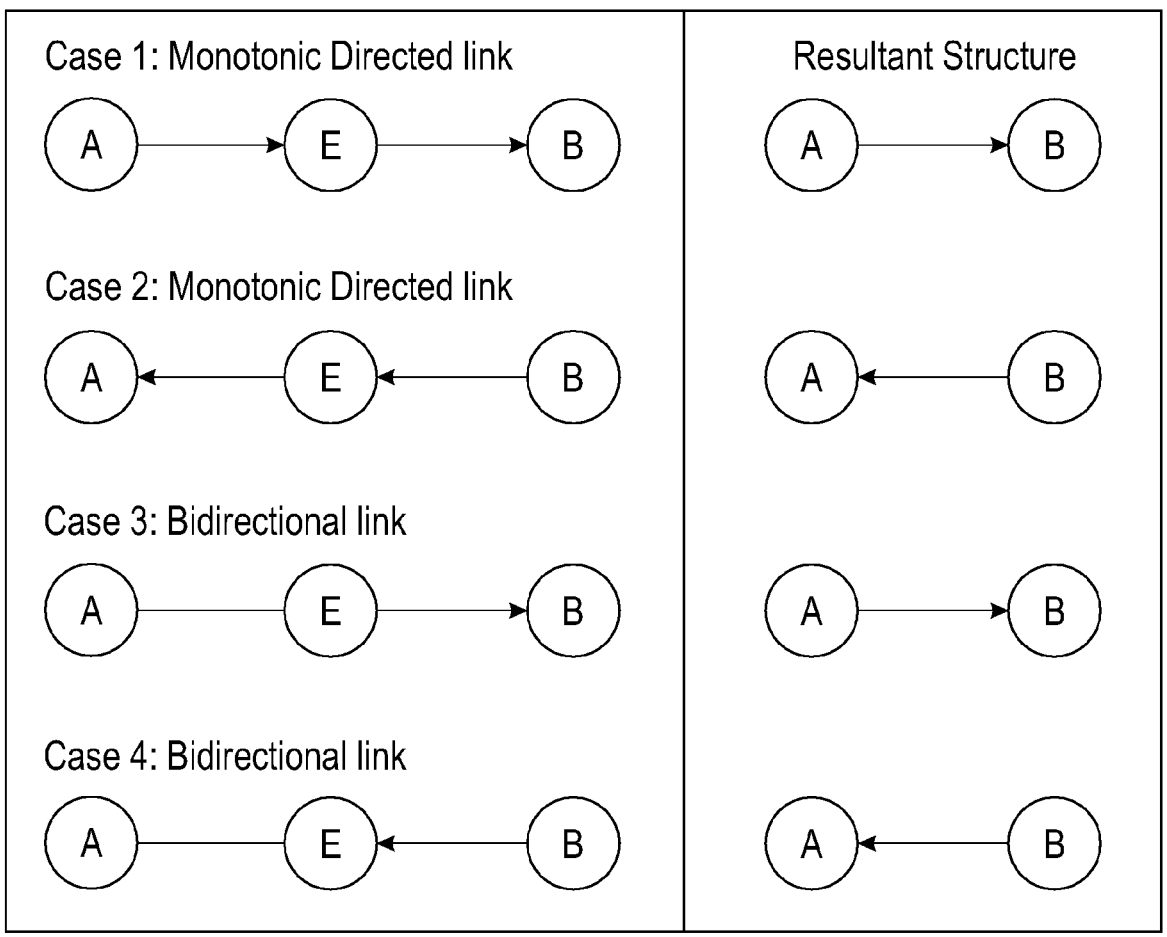
FIG. 5 is a schematic diagram of new edge directions.
Figure 6:
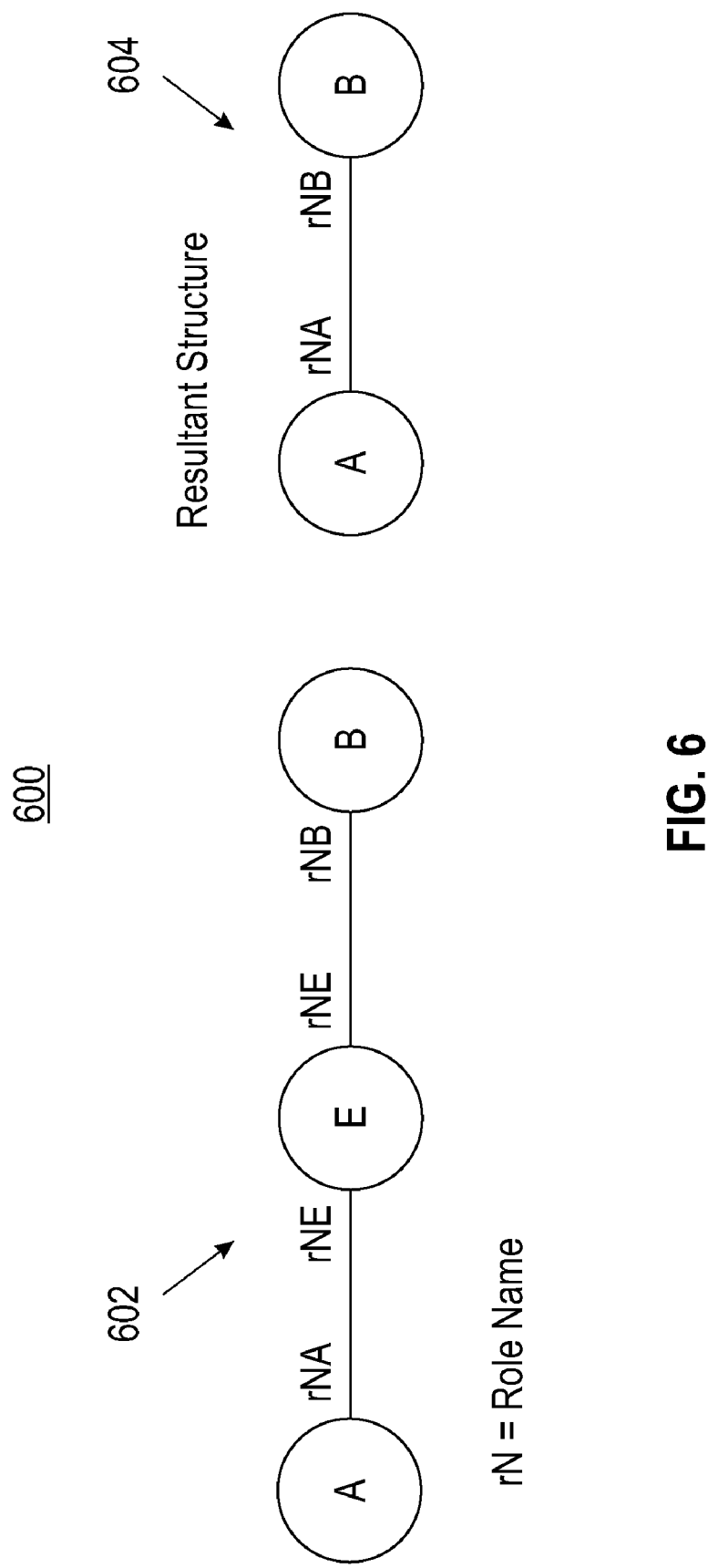
FIG. 6 is a schematic diagram of newly formed edges between nodes.
Figure 7:
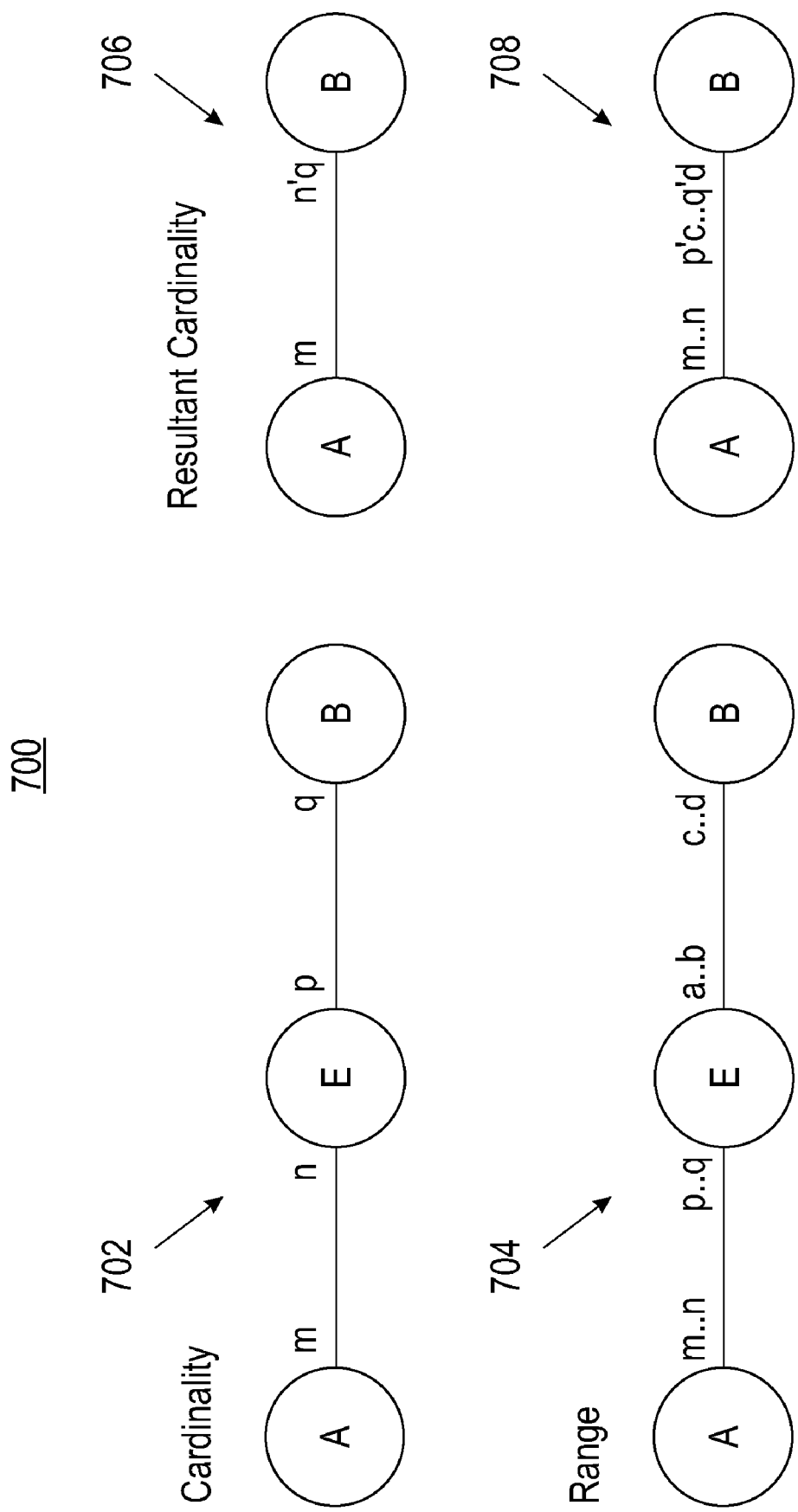
FIG. 7 is a schematic diagram demonstrating cardinality of a new edge.

Attributes of a new edge $e_{ij}$ are determined as follows:
1. Name of the Association: A new name is assigned for a new edge. The names of the dangling ends (edges) are dropped as the association doesn't exist.
2. Direction of Association: Direction of association represents whether an edge is a directed (direction of association) edge or bidirectional edge. The direction of the new association will assume the direction of either of edges $e_1$ and $e_2$, depending on which of these edges are directed. FIG. 5 shows in the right hand column of the table 500 the direction of new edge obtained from the properties of the dangling edges in four self-evident cases in the left-hand column.
3. Role Name: Role Name of the new edges is obtained from the role names of the dangling edges. FIG. 6 shows a table 600 having in the left-hand column a DAG 602 and in the right-hand column the resultant DAG 604 showing the role name of the new edge.
4. Cardinality: Cardinality (also known as multiplicity) for a node A, defined on the edge $e_1$ defines the number of instances of node A that can be associated with an instance of E. The cardinality constraints are propagated. FIG. 7 shows a table 700 having, in the left-hand column a DAG 702 showing the cardinality and a DAG 704 showing the range. In the right-hand column is shown the resultant cardinality of the new edge by way of the DAGs 706, 708. This cardinality is obtained by finding the number of instances (minimum and maximum in case the cardinality is expressed as range) of A that would be associated with the B (minimum and maximum if range is specified).

An algorithm for removing and propagating class-level implementation artifacts is as follows:

---

Algorithm 1: Algorithm for Elimination of Class Level Artifacts

```
List lst =getControllerAndBoundaryClasses( );
for all (cls = classes) in lst do
    List lstIncoming = getIncomingLinks(cls);
    List lstOutgoing = getOutgoingLinks(cls); {lstIncoming and lstOutgoing
    does not include bidirectional}
    List lstbi = getBidirectionalLinks(cls);
    for all lnkIn = link in lstIncoming do
    node thisEndNode = getNode(lnkIn);
    string thisEndRoleName = getRoleName(lnkIn);
    int thisEndUpperBound = getUpperBound(lnkIn);
    int thisEndLowerBound = getLowerBound(lnkIn); {Connecting the
    incoming link and outgoing link}
    for all (lnkOut = link) in lstOutgoing do
        otherEndNode = getNode(lnkOut);
        string otherEndRoleName = getRolename(lnkOut);
        int otherEndUpperBound = getUpperBound(lnkOut);
        int otherEndLowerBound = getLowerBound(lnkOut);
        createNewDirectedEdge(thisEndNode,
        OtherEnd,thisEndRoleName,
        thisEndUpperBound, otherEndRoleName, otherEndLowerBound,
        otherEndUpperbound);
    end for{Connecting incoming and bidirectional links}
    for all (lnkbi=link) in lstbi do
        otherEndNode = getNode(lnkbi);
        string otherEndRoleName = getRolename(lnkbi);
        int otherEndUpperBound = getUpperBound(lnkbi);
        int otherEndLowerBound = getLowerBound(lnkbi);
        createDirectedNewEdge(thisEndNode,
        OtherEnd,thisEndRoleName,
        thisEndUpperBound, otherEndRoleName, otherEndLowerBound,
        otherEndUpperbound);
    end for
    end for
end for
```

---

Preserving Environmental Relationships

Environmental relationships, according to applicable rules, include the inheritance, aggregation and composition relationship, and entities which have a USING relationship.

Figure 8:
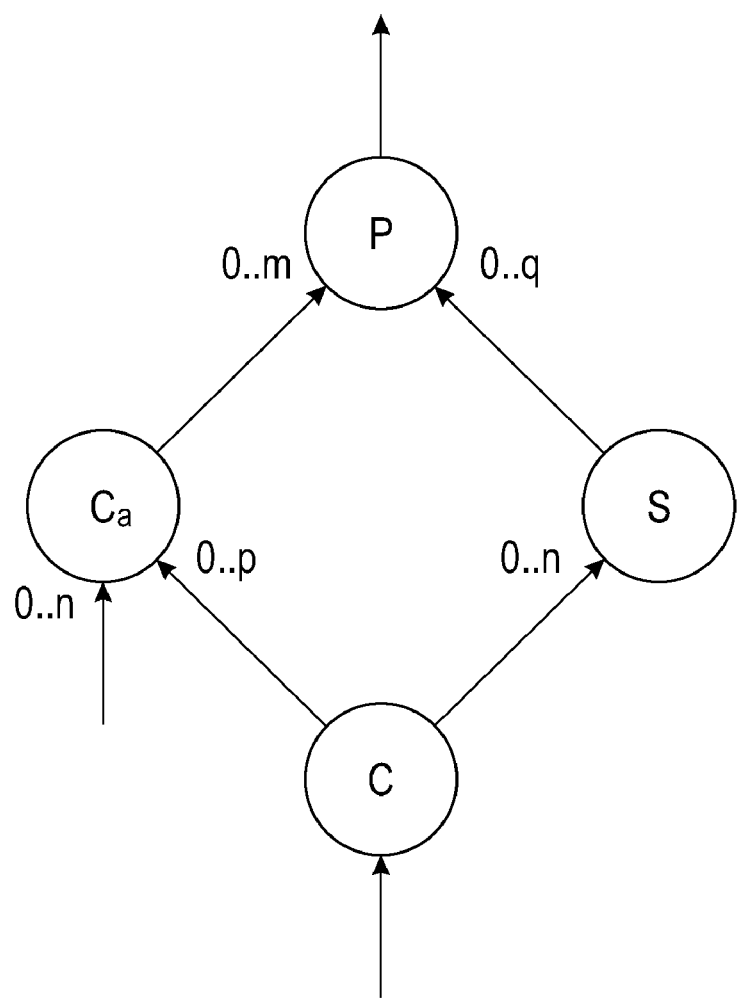
FIG. 8 is a schematic diagram showing a generic model of the neighbors of a candidate class.

Inheritance Relationship: Let GI represent the inheritance graph (DAG) obtained from the class diagram. The interest is in preserving the inheritance neighbors for the class of interest, also called the candidate class $C_a$. The neighbors are those nodes that influence $C_a$ and are influenced by $C_a$. In other words, only classes that are of interest with respect to the candidate class are maintained. FIG. 8 gives a generic model 800 of the neighbors of the candidate class $C_a$. $C_a$ has 0 to m parents, 0 to q siblings and 0 to p nodes that are children of $C_a$ and S and 0 to n children. The node $C_a$ might or not have siblings, but if the siblings exists then parent node P exists.

Figure 9B:
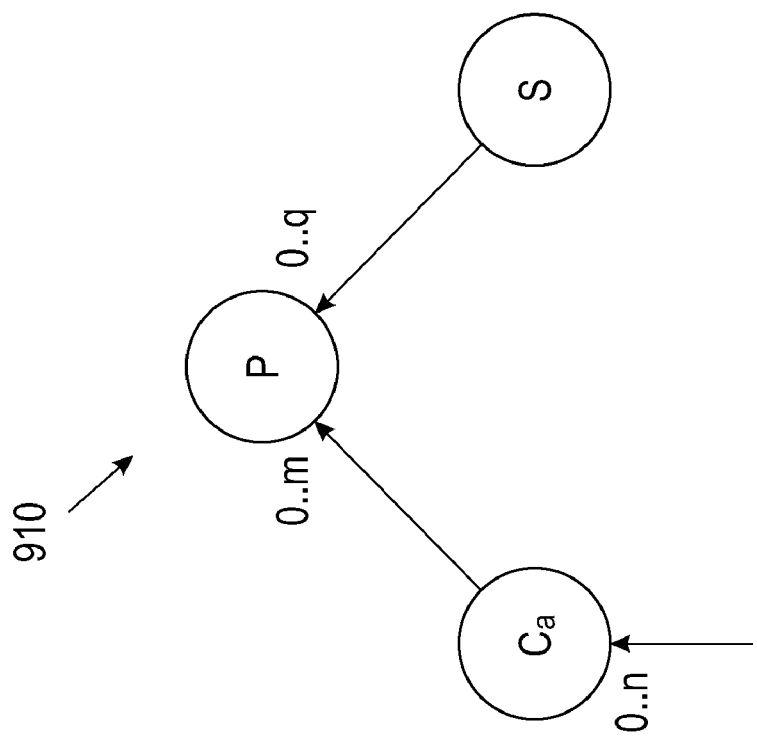
FIGS. 9A and 9B show two resulted cases resulting from the generic model of FIG. 8.
Figure 9A:
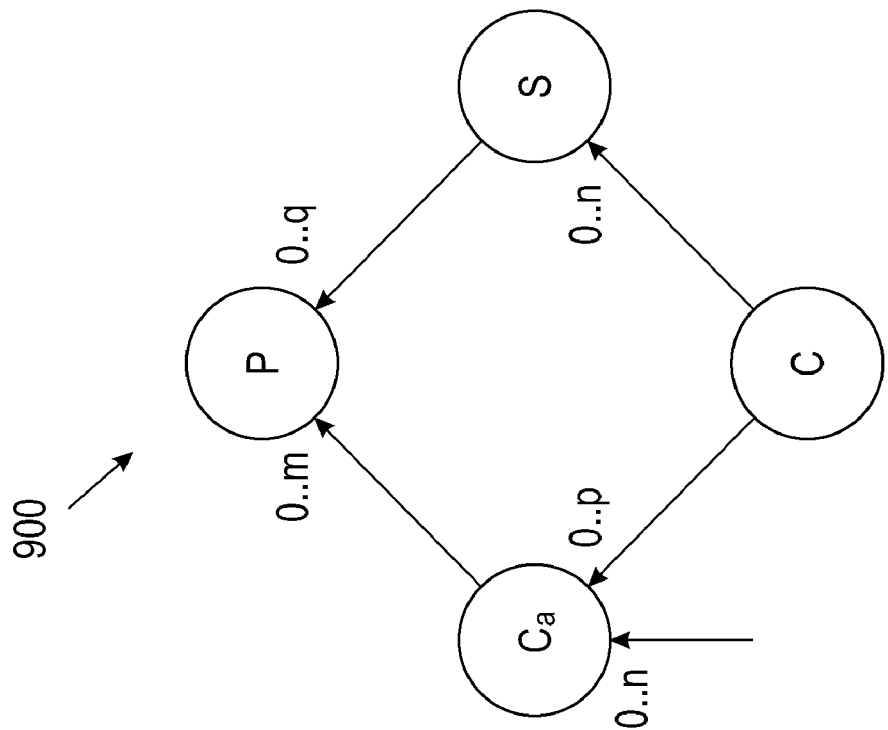

The generalized model for neighbors can be divided into two cases based on whether the children of $C_a$ are influenced by its siblings or not influenced by its siblings. FIGS. 9A and 9B show the two cases 900, 910 arising from the generic model 800 shown in FIG. 8. Case 1 (FIG. 9A) is where C is derived from both $C_a$ and S. Case 2 (FIG. 9B) is where C has children that are not influenced by S. $C_a$ is influenced by all its ancestors so all the parents are preserved. $C_a$ influences all the nodes that are derived from $C_a$ so all the children are preserved. The siblings of $C_a$ do not affect $C_a$ so the siblings are not preserved. The effects of siblings on children of $C_a$ if any, can be ignored.

Figure 10:
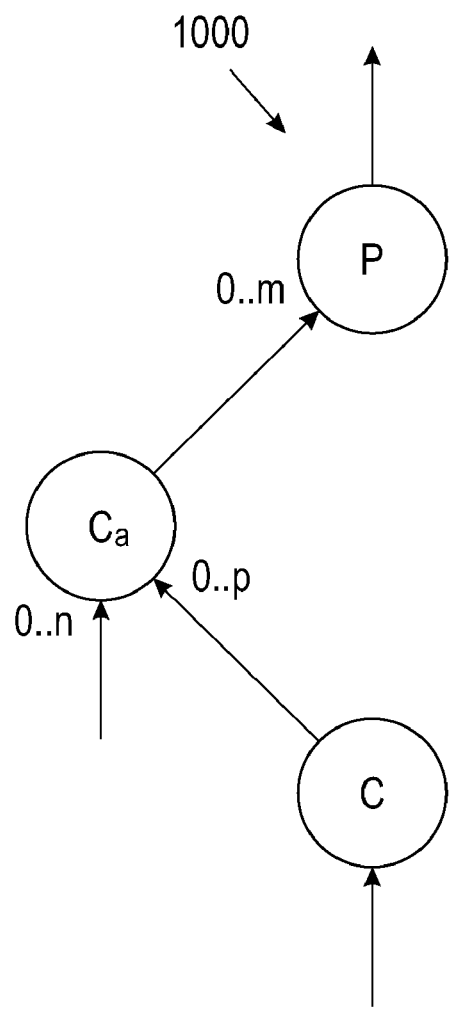
FIG. 10 is a schematic diagram showing a generic model of an output graph.

In short, for a node $C_a$ the inheritance neighbors (environmental relationship) are its ancestors and descendants. FIG. 10 presents a generic model 1000 of the output graph that would be obtained for an input graph GI.

Figure 11:
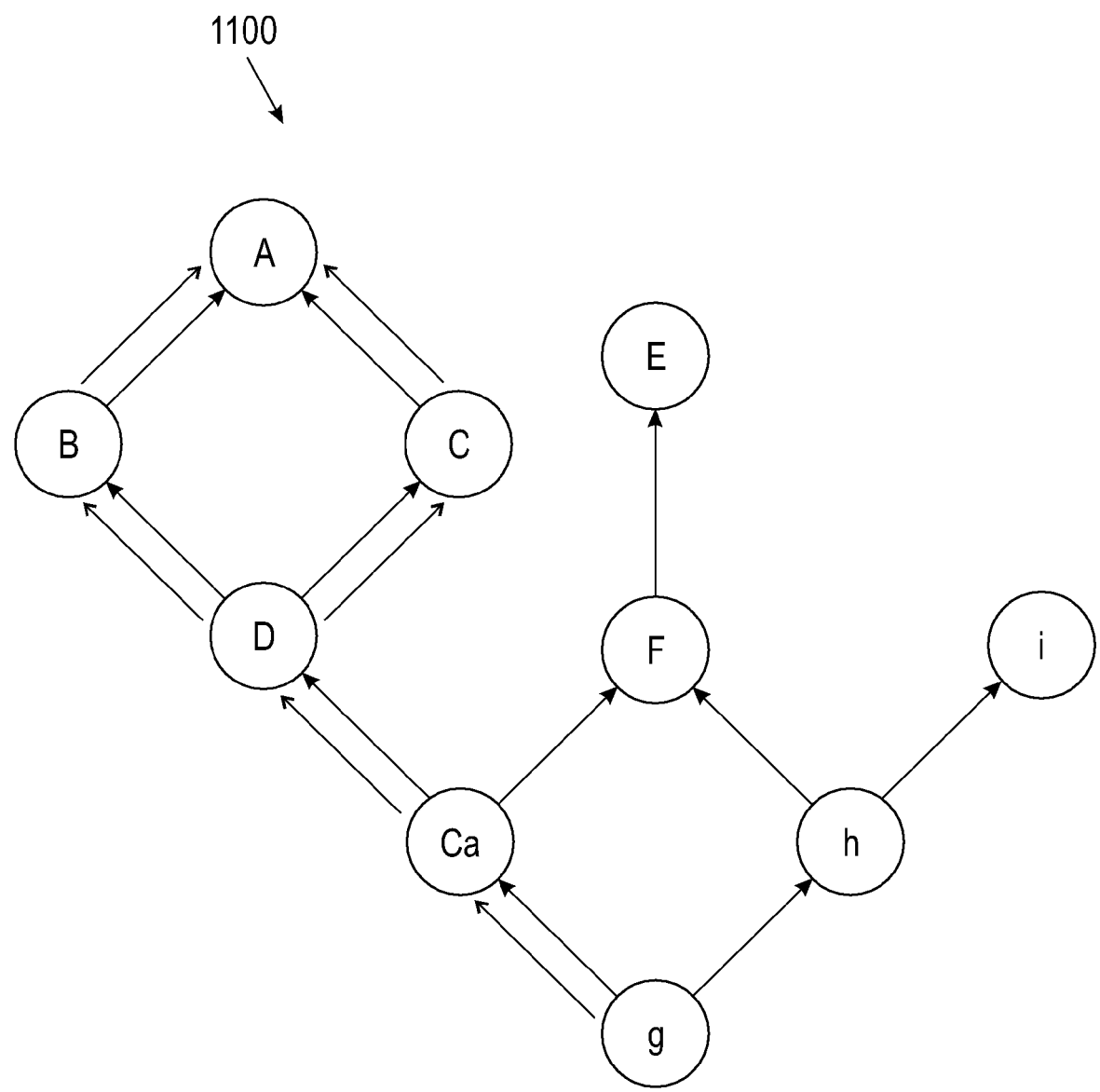
FIG. 11 is a schematic diagram showing a sample input inheritance graph and the pruning of ancestors and descendants.

FIG. 11 shows the sample input inheritance graph 1100 and the pruning of ancestors and descendants from this input graph. Algorithm 2 presents the algorithm that preserves the inheritance environmental relationship for a node $C_a$. The algorithm obtains all its parents by finding those nodes to which there is a path from $C_a$ in GI. Similarly, all the nodes that have a path to $C_a$ are preserved as descendants.

---

Algorithm 2 Inheritance - Algorithm for obtaining neighbors for candidate class

```
Input: Inheritance graph GI, Candidate Class Ca
Output: Pruned Inheritance Graph GIout.
rootNode = C_a
while (currnode! == rootNode) do
    boolean IsFound =IsPathtoRoot(currnode);
    if (isFound) then
        addCurrNode(currnode,GIout);
    end if
end while
node =rootNode
while node!=null do
    List lstparents =getParents(node);
    addParentsToOutput(lstparents,GIout)
    addParentsToCurrentList(lstparents);
    node = getFromCurrentlist( );
end while
```

---

The algorithm for maintaining aggregation and composition relationship is the same as described for the inheritance relationship (i.e., Algorithm 2).

Aggregation is a type of "has-a" relationship, and refers to the situation when one class contains another class through variable reference. Aggregation is the typical whole/part relationship.

Composition also is a type of "has-a" relationship, and refers to the situation when one class is contains another class. Composition is similar to aggregation except that the lifetime of the 'part' is controlled by the 'whole'. This control may be direct or transitive. That is, the 'whole' may take direct responsibility for creating or destroying the 'part', or it may accept an already created part, and later pass it on to some other 'whole' that assumes responsibility for it.

Directed and Bidirected Relationship represents a USING relationship between two classes. It represents exchange of messages between two classes. The USING relationship in a class diagram does not directly reflect environmental relationship. The actual set of nodes and relationship that uses $C_a$ can only be obtained from dynamic diagrams. The class diagram gives the static view and one cannot decide with static information whether $C_a$ is actually being used or using other entities. For such relationship greater interest is in the classes that help to achieve the functionality (use case) by the relationship rather than the relationship by itself. A comparative study of the UML diagrams in Table 1 determines a list of candidate diagrams that would provide use case details.

Table 2 gives the different UML diagrams and their primary aim.

TABLE 2

| Diagram | Functionality | Remarks |
| --- | --- | --- |
| Class diagram | Static information about the elements used for building the software solution | No runtime information |
| Object diagram | Instance and a snapshot of execution - static behavior of a system at run time | Does not provide use case functionality |
| Collaboration diagram | Collaboration between different objects for a use case | No information about message exchanged |
| Sequence diagram | Time line diagram of the exact sequence of the messages exchanged | Gives a functionality of each of the links |
| Activity diagram | Sequence of activities for a use case. More explanatory than the flow charts | Shows work flow from a start point to end point |
| Package diagram | Entities that are packed into a single module | No information about messages exchanged |
| Component diagram | Gives the different components involved in the design | Gives a component structure |
| Use case | Identifies boundary conditions | No information about the messages exchanged |

From Table 2 it can be inferred that the functionality achieved by the USING relationship can be obtained from the dynamic diagrams such as sequence or activity diagrams (dynamic behavior of the system) which models use case details.

Sequence diagrams and activity diagrams model the behavior of the use cases (functionality) by describing the way groups of object interact to complete the task. An activity diagram is a behavior diagram that indicates the sequence of activities (and is more expressive than the state diagram). Activity diagrams are used to model the logic captured by a single use case diagram. A sequence diagram is an interaction diagram that gives the detailed communication, exchange of information between two objects. Sequence diagrams describe the objects of the systems and the services they provide. The significance here is the messages exchanged (i.e., a USING relationship) and the services offered by the objects. Therefore, the sequence diagram is used to identify different directed and bidirectional links that would be preserved.

Sequence diagrams model the USING relationship for specific use cases. All of the sequence diagrams that have object of class type $C_a$ are examined. The other entities (class types) in these sequence diagram use $C_a$ for achieving the specific use case. These entities and their relationship are preserved as environmental relationship of the form: USING relationship. Algorithm 3 presents the procedure for extracting information from a sequence diagram.

---

Algorithm 3 Algorithm for preserving a USING relationship lstSequence = getRelatedSequenceDiagram(Ca);
for all seqDia in lstSequence do
   lstEntitiesClasses = getEntitiesFromSequence(seqDia);
   for all entityCls in lstEntitiesClasses do
     maintainEdges(entityCls);
   end for
end for

---

EXAMPLE

Consider a student course registration, with the following design description:

At the beginning of each semester students may request a course catalogue containing a list of course offerings for the semester. Information about each course, such as professor, department, and prerequisites will be included to help students make informed decisions. The new on-line registration system will allow students to select four course offerings for the coming semester. In addition, each student will indicate two alternative choices in case a course offering becomes filled or canceled. No course offering will have more than ten students. No course offering will have fewer than three students. Once the registration process is completed for a student, the registration system sends information to the billing system, so the student can be billed for the semester. Professors must be able to access the on-line system to indicate which courses they will be teaching. They will also need to see which students signed up for their course offering. The billing system will credit all students for courses dropped during this period of time.

Figure 12:
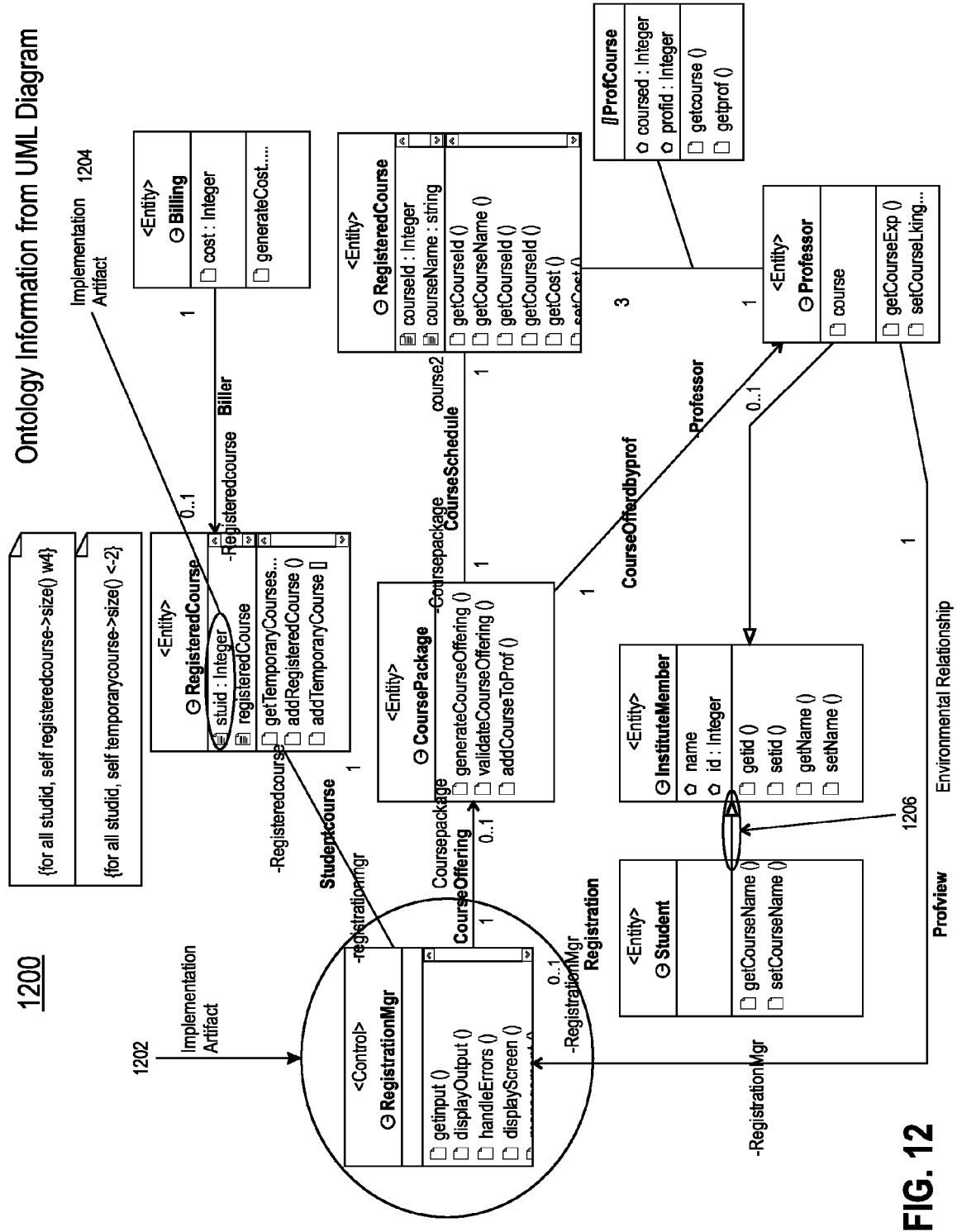
FIG. 12 is a class diagram for an example software design.

FIG. 12 is a class diagram 1200 for this design statement. In FIG. 12, certain of the implementation and environmental artifacts determined by the above-mentioned process are identified. The class RegistrationMgr 1202 is a class level implementation artifact (co-ordinates messages between other entities). The attribute 'stuID' in the class RegisteredClass 1204 is a attribute level implementation artifact introduced to maintaining uniqueness of the entity. Environmental artifacts such as class 'Student' 1206 inherits from 'InstituteMember' 1208 are evident. Environmental artifacts reflecting domain concepts, OntExtract proceeds by preserving environmental artifacts and removing implementation artifacts.

Figure 13:
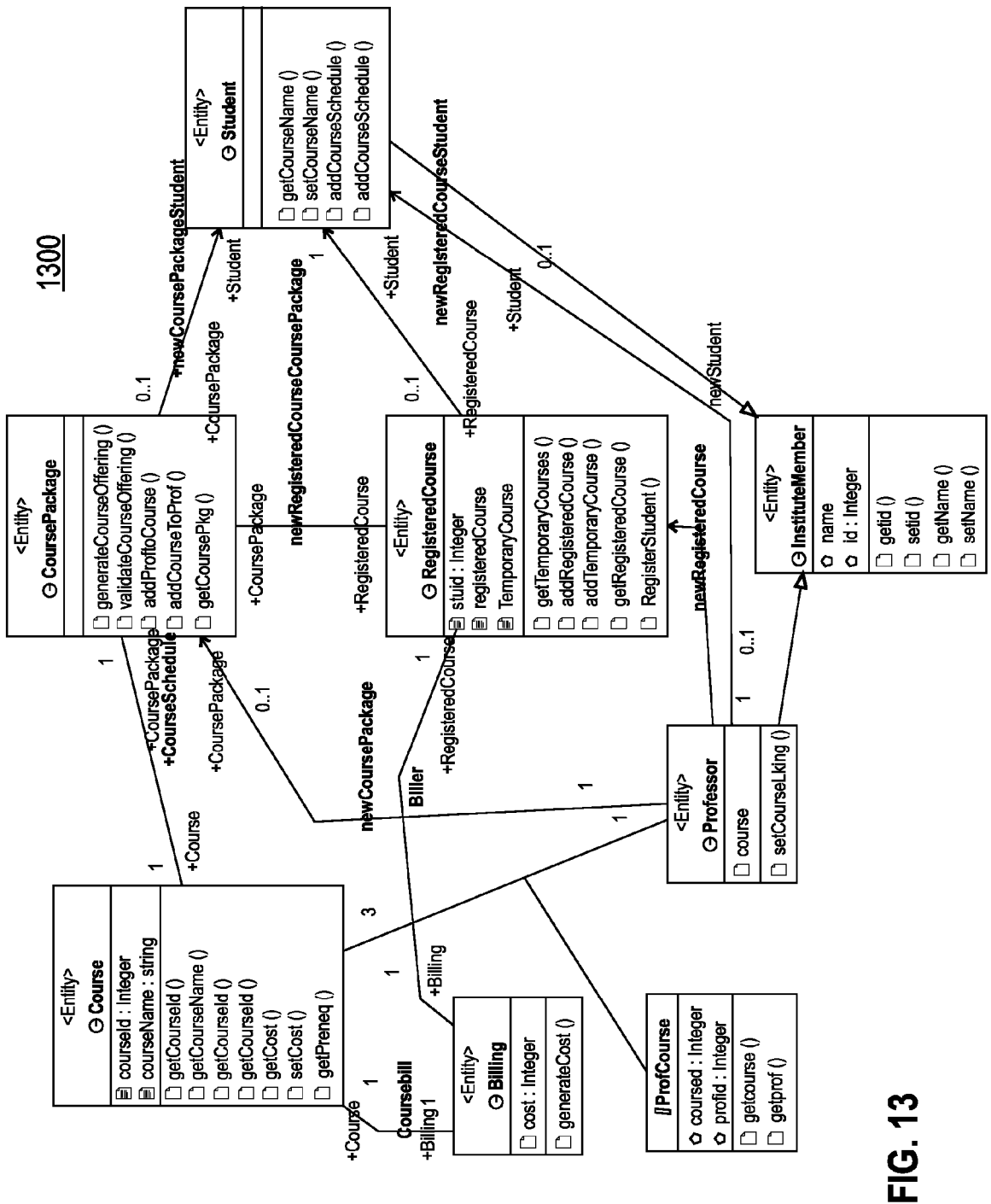
FIG. 13 is the class diagram of FIG. 12 with class level implementation artifacts removed.

FIG. 13 shows a class diagram 1300 after elimination of all class level implementation artifacts.

Figure 14:
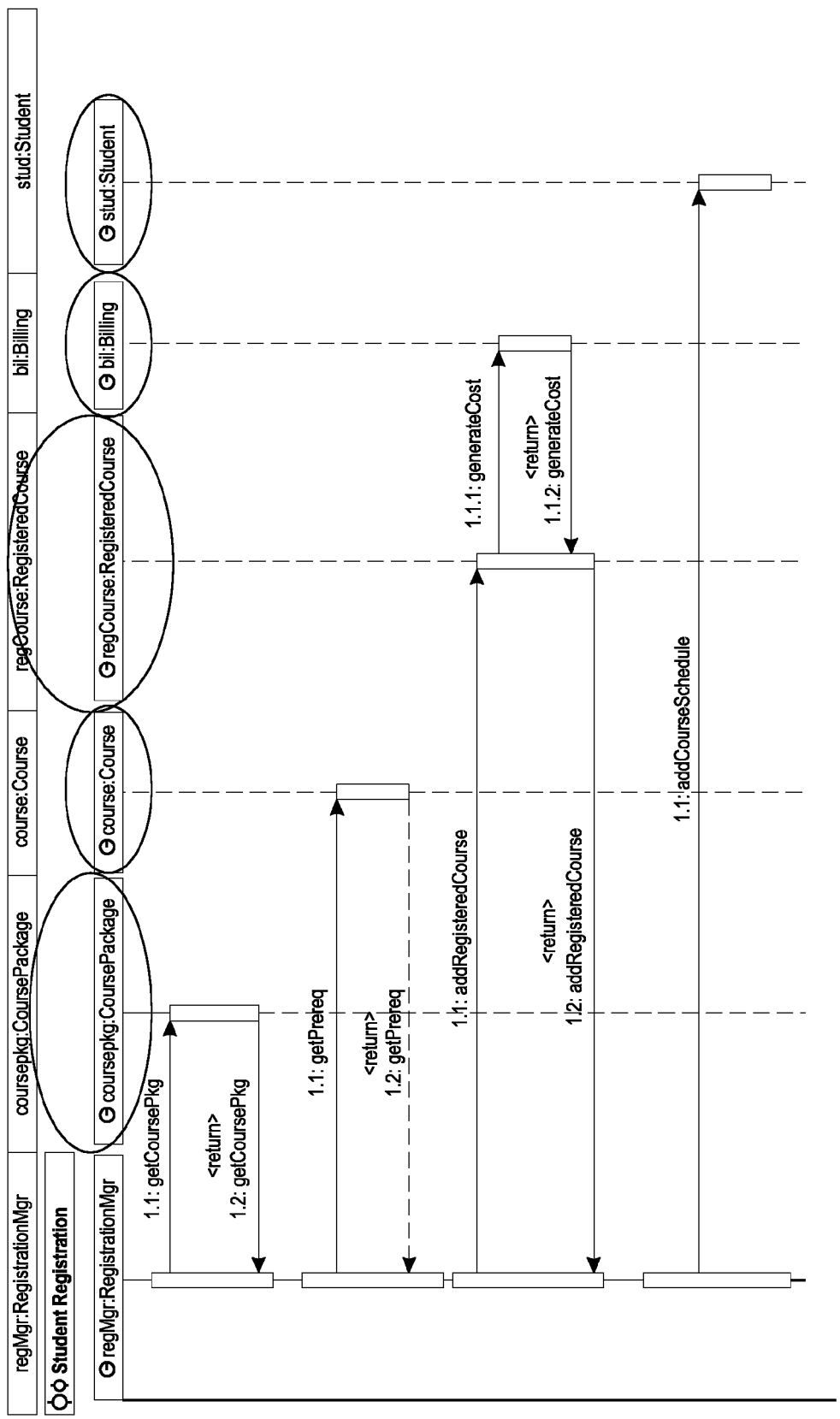
FIG. 14 is a sequence diagram.

FIG. 14 shows the sequence diagram 1400 for the use case 'course registration'. The classes CoursePackage, Course, Registered Course, and Billing that are related to the candidate class {Student} through these sequence diagrams are preserved as ontological information.

Figure 15:
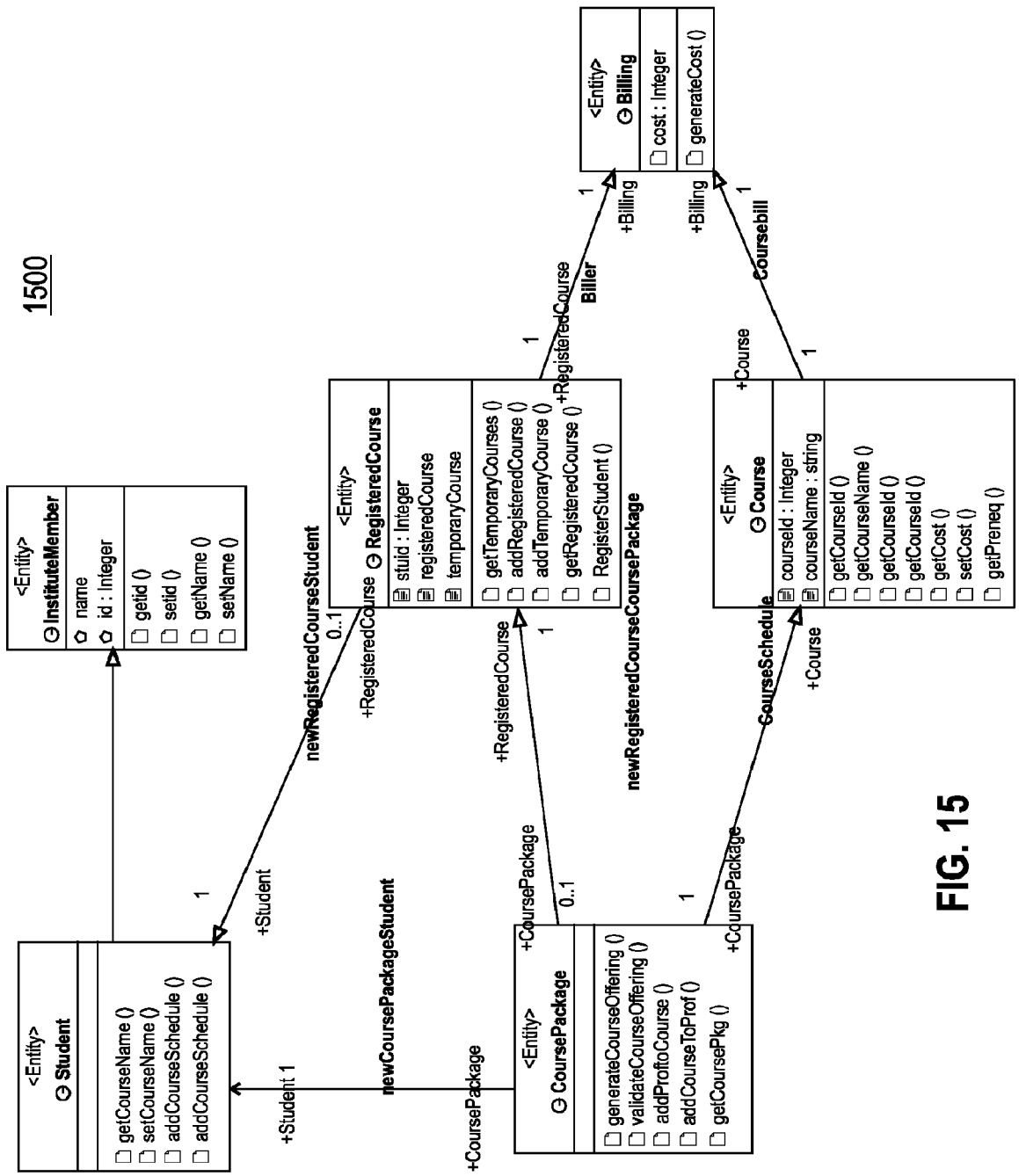
FIG. 15 is an extracted ontology diagram.

FIG. 15 shows the resultant Ontological Diagram 1500 that represents the extracted ontological information for the domain requirement {Student}.

Ontology Extraction from Multiple Ontology (Class) Diagrams

Ontology diagrams generated from each of a plurality of class and sequence data can be aggregated to form aggregated domain ontology. Aggregating domain ontologies enables adding domain information to the existing the domain knowledge. The objective is to add/delete/update information relevant to the domain.

Let $OCD_i$ represent the ontology diagram representing the ontology from the $i^{th}$ UML diagram. Aggregating multiple class diagrams can be done in either of two ways: (a) a consolidated approach, and (b) an incremental approach.

Figure 16:
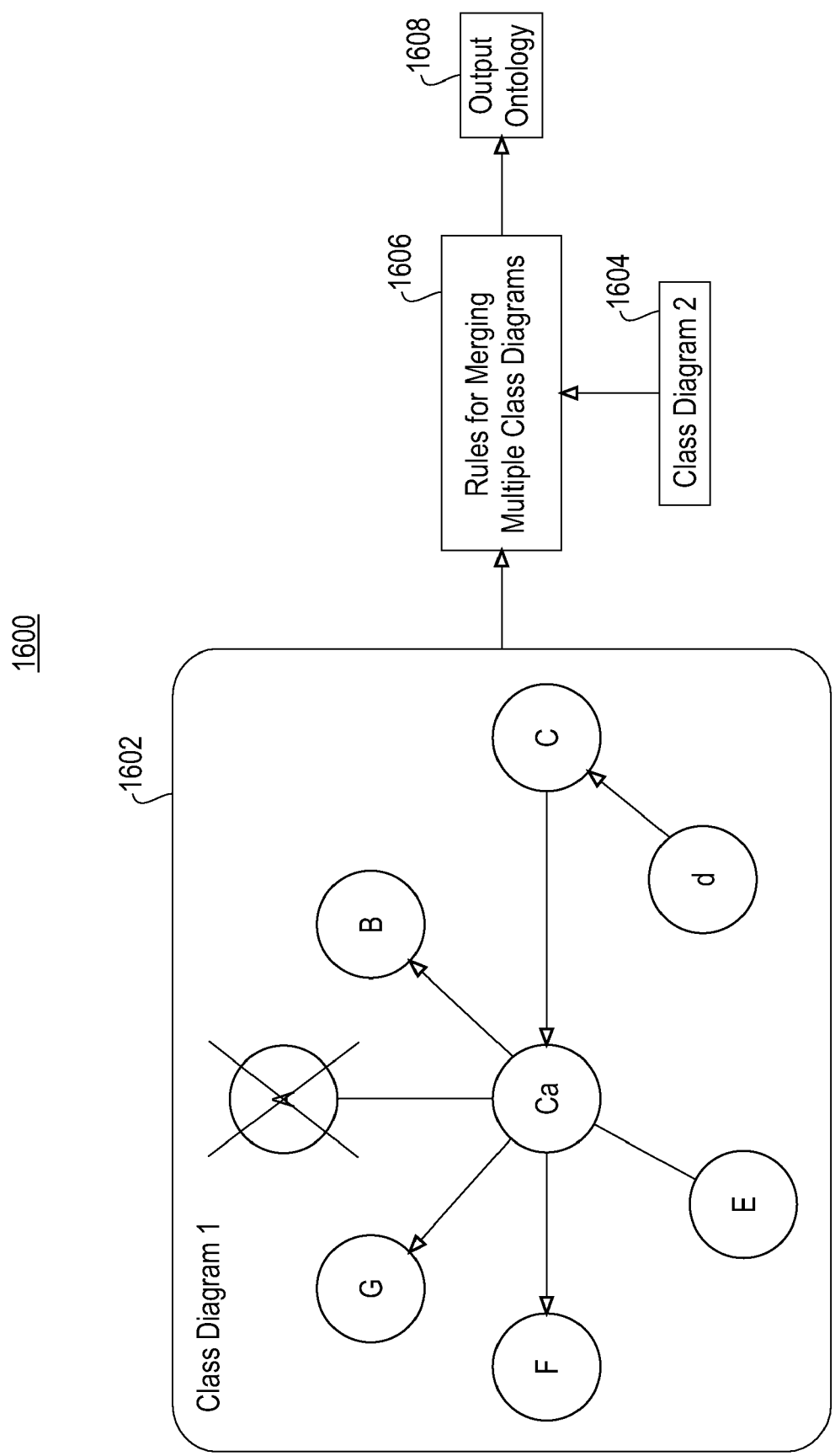
FIG. 16 is a schematic diagram showing the aggregation of multiple class diagrams by consolidation.

In the consolidated approach, multiple $OCD_i$ are aggregated considering all the environmental relationship at a time. FIG. 16 shows a process 1600 demonstrating the consolidated approach. Here, two class diagrams 1602, 1604 are input to a module 1606 holding rules for merging multiple class diagrams. The output 1608 of the merging module 1606 represents the merged domain ontology.

In the incremental approach, one environmental relationship at a time is considered from multiple $OCD_i$ and they are merged. The resultant structure contains aggregated domain ontology only with respect to one environmental relationship. The next incremental step considers another relationship and aggregate domain ontology with respect to this relationship and finally merges with the resultant structure of the previously considered relationship. This is repeated until all the relationships are considered.

Figure 17:
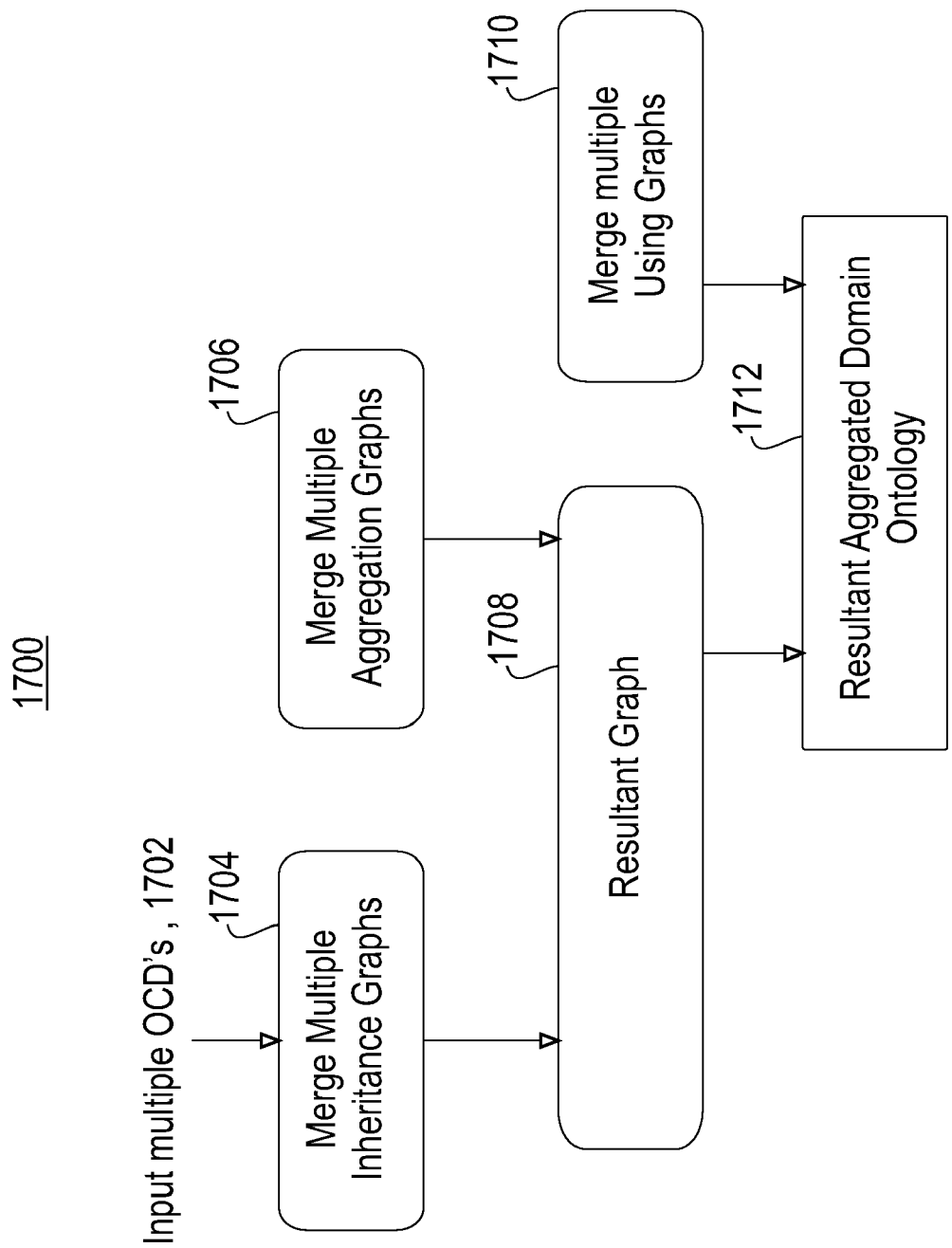
FIG. 17 is a schematic diagram showing the aggregation of multiple class diagrams by increment.

FIG. 17 shows a process 1700 demonstrating the incremental approach. Here, multiple ontology diagrams 1702 are input to a module 1704 that merges the related multiple inheritance graphs. Next, the merged inheritance graphs of plural modules 1704 and merged multiple aggregation graphs 1706 are provided to a module 1708 that generates a resultant graph. Finally, the resultant graph 1708 and the merge multiple using graphs 1710 are aggregated to form a resultant aggregated domain ontology 1712.

The incremental approach now will be described in further detail.

Semantic Distance

Semantic distance influences addition/deletion/update of class information. Semantic distance is defined as spatial distance between the two nodes in ontology graphs.

Semantic distance can be measured using an edge counting graph method (e.g. Rada, R., et al, Development and Application of a Metric on Semantic Nets, IEEE Transactions on Systems, Man and Cybernetics 19: 17-30). Such a method builds a tree of using classes as nodes and relationship as edges, and calculates the semantic distance between the nodes. This gives a good estimate of how close two nodes are. In an edge counting method, the semantic distance between two nodes is measured as the number of edges between two nodes. The semantic distance between nodes is reduced to the distance between concepts in the built tree structures.

Calculation of semantic distance is not applicable to nodes that have a USING relationship. The distance between concepts is determined according to their positions in the tree hierarchy. When the tree hierarchy is (n+1) layered, (k/n) nodes is connected to the classes in the $k^{th}$ (for present purposes the $k^{th}$ node is $C_a$) from the bottom (0<k<n).

$$SemDist = k/n \text{ for hierarchical tree structure} \quad (1)$$

Let $\delta$ be the desired SemDist. The value SemDist obtained by equation (1) leads to two important inferences. If SemDist<$\delta$, then the tree structure represents a 'Generalization'. If SemDist>$\delta$, then the tree structure represents a 'Specialization'. Generalized tree structures give more flexibility in terms of reusable components, while specialized tree structures typically provide detailed categorization for a particular component in the tree hierarchy. More generalized the tree structure, more reusable are the components. Since one object of extracting ontologies is to achieve re-usability, the algorithm targets to keep the SemDist as low as possible (minimum). The criterion of keeping SemDist as low as possible is used to design efficient algorithms to merge multiple ontologies. This criterion by itself doesn't provide information about how semantic distance (distance between concepts) is calculated when multiple class diagrams (OCDs) are considered.

Inheritance Relationship

The objective is to aggregate domain knowledge by merging multiple inheritance relationship graph. This requires adding/deleting/updating nodes in one inheritance graph when another inheritance graph is considered. Therefore, the issues related to adding/deleting/updating a node structure are addressed. The metric semantic distance that gives the relative closeness (semantically related) of the nodes and based on criterion to maintain semantic distance as low as possible, it is decided either to add or delete or update the nodes.

Calculation of semantic distance in an inheritance tree is based on an edge counting graph metric in which distance between the nodes is measured by counting the number of edges in the shortest path between the two concepts. The use of edge counting metric is appropriate for two reasons: (a) IS-A relationship implies that a node derives properties of the parent node. It is a containment which is carried as-is into the node that derives from, and (b) Edges between nodes in the inheritance graph are not influenced by a semantic distance between the two nodes. Nodes are not related by the amount of degree one uses the other (unlike HAS-A relationship). Considering the above facts it would be appropriate to say that the nodes are related to each other by the edge count. The lesser the edge count implies that nodes are related to each other more closely (principle of closeness) and vice-versa.

The objective is to preserve all the ancestors of the $C_a$ and maintain minimum information about specialization. The following rule is used to add/delete/update nodes: (a) all generalization nodes of $C_a$ are preserved (preserve longest path between nodes), and (b) for specialization nodes, the shortest path between nodes is preserved.

Let $GI_1$, and $GI_2$ be two inheritance trees from two UML sources. Let $x_{11}$ and $x_{21}$ represent the same nodes in $GI_1$ and $GI_2$ respectively. Similarly, Let $y_{11}$ and $y_{21}$ represent another same nodes in $GI_1$ and $GI_2$ respectively that are derived from $x_{11}$, and $x_{21}$ respectively. Let the semantic distance between $x_{11}$ and $y_{11}$ be $d_2$ (obtained by edge count method) and semantic distance between $x_{21}$ and $y_{21}$ be $d_2$. Table 3 gives the interpretation that can be made about the two set nodes given the criterion of maintaining low semantic distance:

TABLE 3

| Calculated semantic distance | Preference: preserve generalization | Preference: minimize specialization information | Remarks |
| --- | --- | --- | --- |
| $d_1 < d_2$ | Replace path ($x_{11}$ to $y_{11}$) by ($x_{21}$ to $y_{21}$) | Replace path ($x_{21}$ to $y_{21}$) by ($x_{11}$ to $y_{11}$) | This implies that two nodes are more closely related in $GI_1$ than what they appear to be in $GI_2$ |
| $d_1 > d_2$ | Replace path ($x_{21}$ to $y_{21}$ by ($x_{11}$ to $y_{11}$) | Replace path ($x_{11}$ to $y_{11}$) by ($x_{21}$ to $y_{21}$) | This implies that two nodes are more closely related in $GI_2$ than what they appear to be in $GI_1$ |

TABLE 3-continued

| Calculated semantic distance | Preference: preserve generalization | Preference: minimize specialization information | Remarks |
|---|---|---|---|
| $d_1 = d_2$ | No change | No change | Semantic distance same implies that structures in both graphs $GI_1$ and $GI_2$ are the same |

Figure 18:
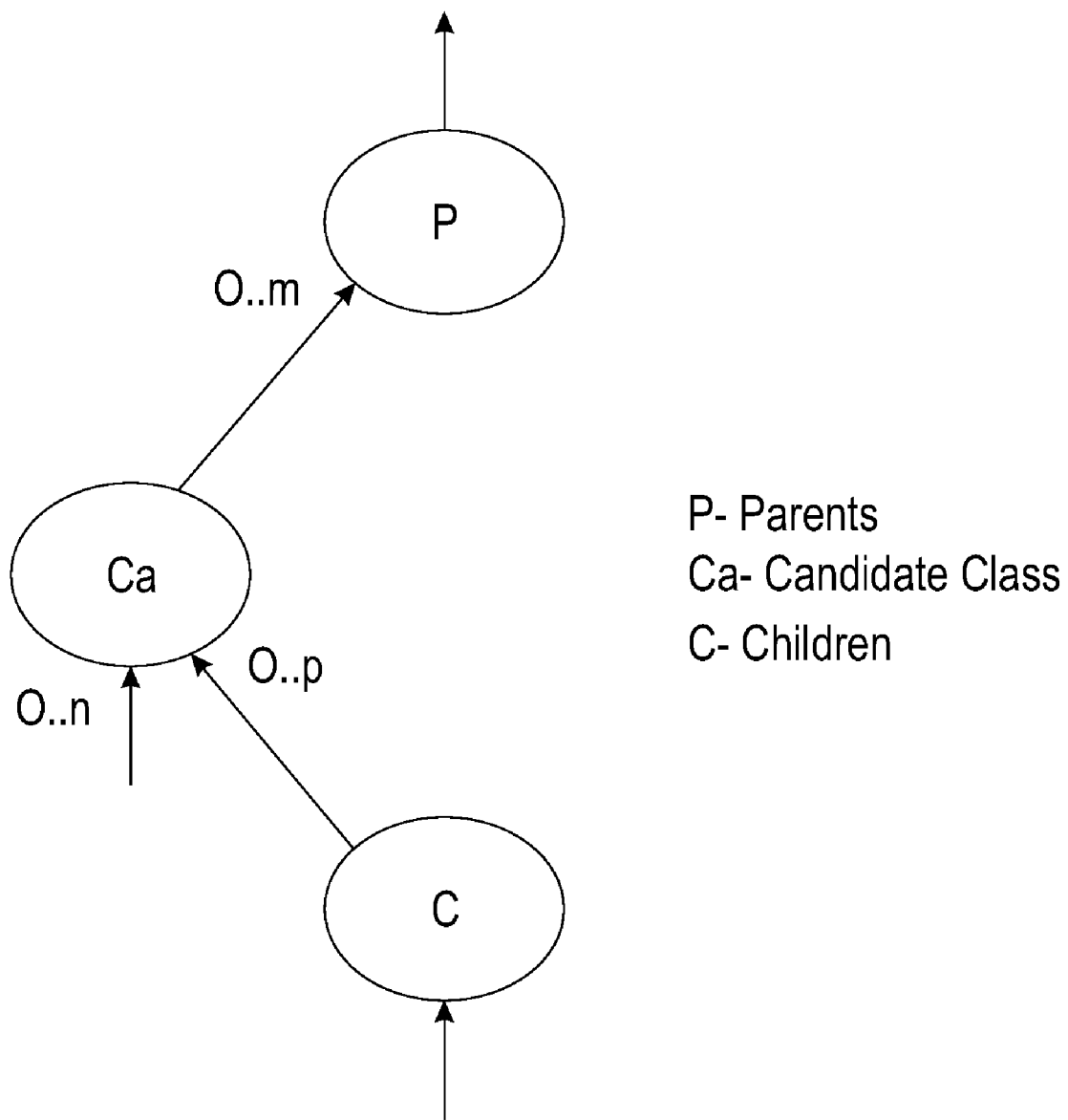
FIG. 18 is a schematic diagram of an input inheritance graph.

The input inheritance graph 1800 is given in FIG. 18. The nodes that are related to $C_a$ are the ancestor nodes and descendant nodes. Let $GI_1$ and $GI_2$ be such input graphs.

Given two inheritance graphs $GI_1$ and $GI_2$, the merged inheritance graph $GI_{out}$ for nodes that are generalization of Ca is computed as follows:

Consider $GI_1$ as the reference. If $d_1$ (semantic distance between $x_{11}$ and $y_{11}$) in $GI_1$ is less than $d_2$ and $d_1=1$ (one hop distance) replace path from $x_{11}$ to $y_{11}$ by path from $x_{21}$ to $y_{21}$. If $d_1>1$ and $d_1$ is less than $d_2$ add a new path from $x_{11}$ to $y_{11}$. The new path is the path $x_{21}$ to $y_{21}$. Note that nodes $x_{11}$, and $x_{21}$ are same nodes in $GI_1$ and $GI_2$ respectively. A similar notion holds true for $y_{ij}$.

Figure 19B:
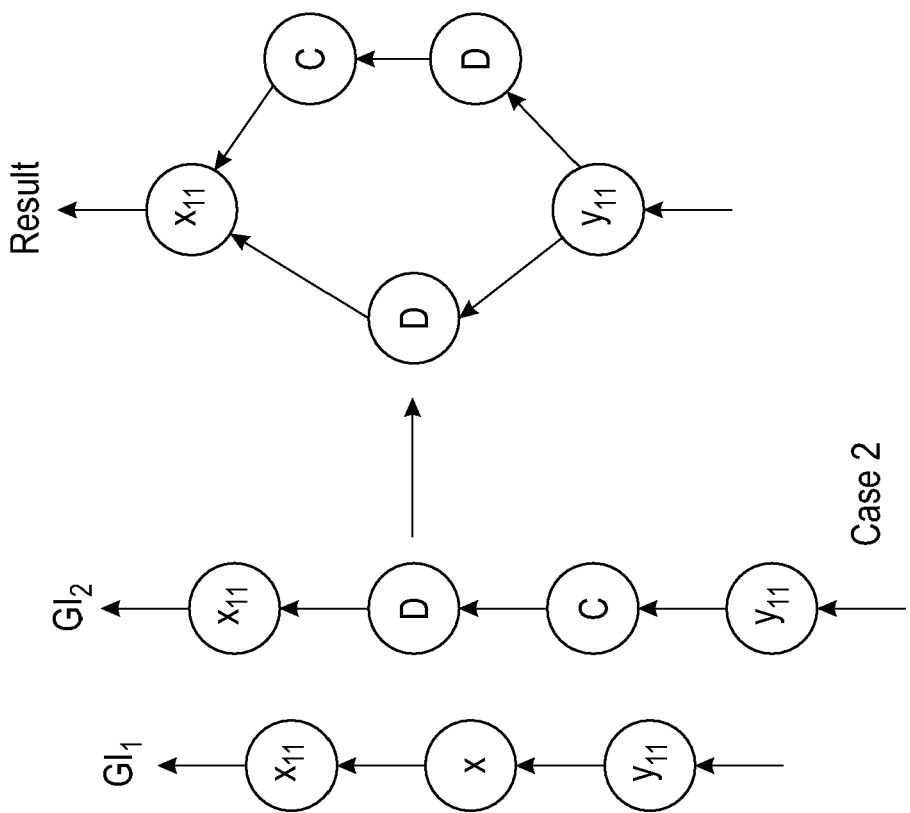
FIGS. 19A and 19B are schematic diagrams of an input and output graph's structure for merging nodes as a generalization.
Figure 19A:
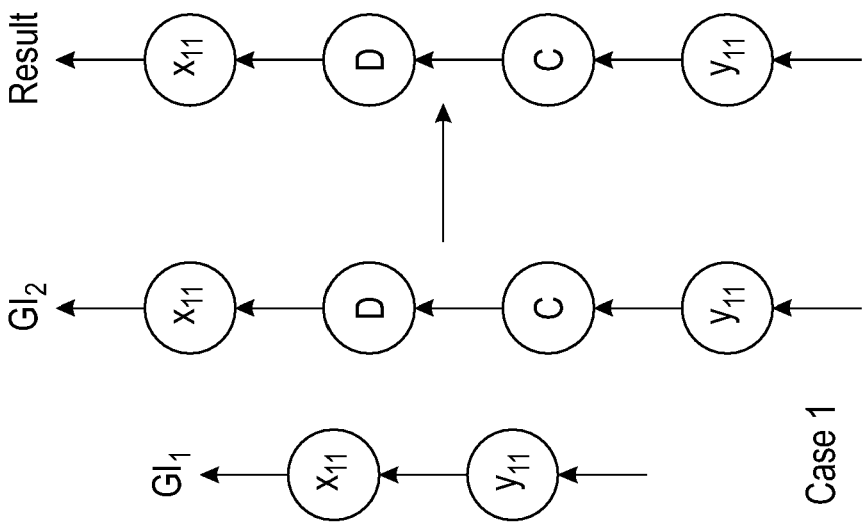

FIGS. 19A and 19B show the input and output graph structures 1900, 1910 for merging nodes that are a generalization of $C_a$ for two cases shown in FIG. 9A and FIG. 9B, respectively.

Figure 20B:
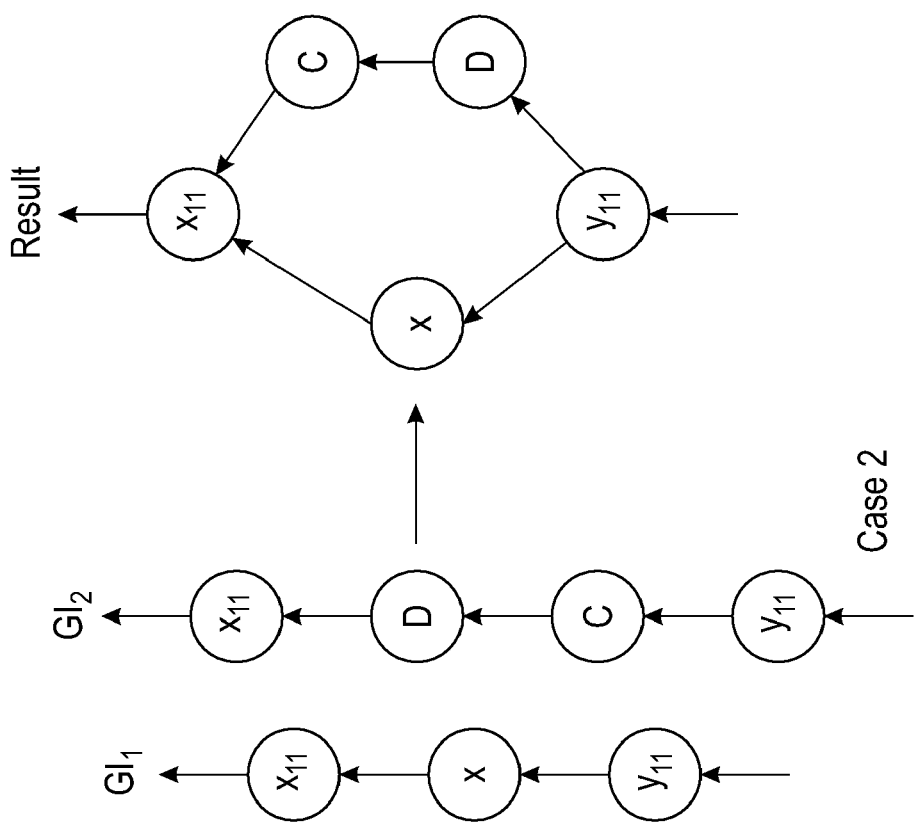
FIGS. 20A and 20B are schematic diagrams of the input and output graph's structure for merging nodes as a specialization.
Figure 20A:
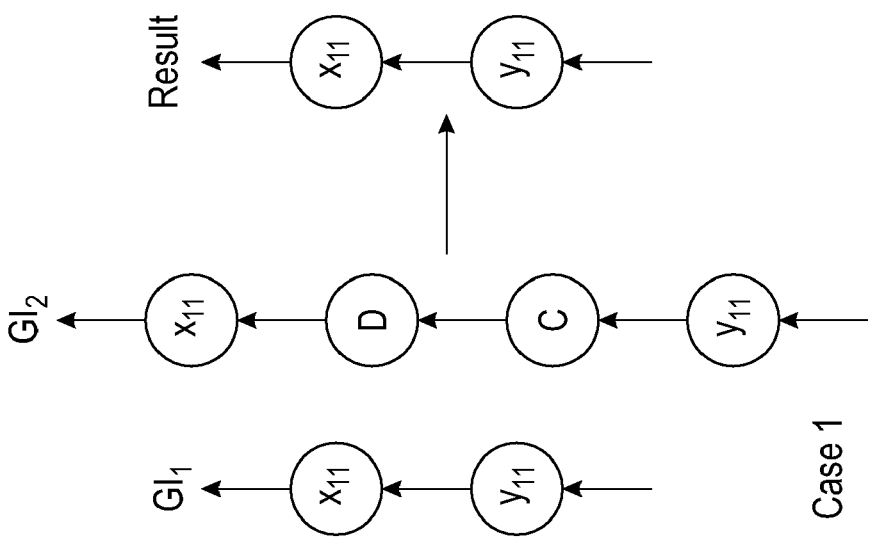

Similarly, given two inheritance graph $GI_1$ and $GI_2$, the merged inheritance graph $GI_{out}$ for nodes that are specialization of $C_a$ is computed as follows:

Consider $GI_1$ as the reference. If $d_1$ (semantic distance between $x_{11}$ and $y_{11}$) in $G_1 < d_2$ and $d_1=1$ (one hop distance), preserve the path $x_{11}$ to $y_{11}$. If $d_1>1$ and $d_1<d_2$ add a new path from $x_{11}$ to $y_{11}$. The new path is the path $x_{21}$ to $y_{21}$. Note that nodes $x_{11}$ and $x_{21}$ are same nodes in $GI_1$ and $GI_2$ respectively. Similar notion holds true for $y_{ij}$. FIGS. 20A and 20B respectively show the input and output graph structures 2000, 2010 for merging nodes that are a specialization of $C_a$ for the two cases of FIGS. 19A and 19B.

Algorithm 4 presents the algorithm for obtaining the merged inheritance graph from two input inheritance graphs.

Algorithm 4: Algorithm for pruning entities in an inheritance tree

```
Input: Inheritance tree GI₁, GI₂, Candidate Class Cₐ
Output: Pruned Inheritance Graph T_out,1,2.
currNode = Cₐ {This is done for generalization}
List NodeDistance = findAllPairsWithDistance(GI₁; GI₂)
for all nodepair in NodeDistance do
    Distance = CompareDistanceWithAllPairs(nodepair, NodeDistance);
    if Distance == onehop then
        if IslongerPathFound( ) then
            replacePairWithLongerPath( )
        end if
    end if
    if Distance!=onehop then
        if IsMatchingNodesFound( ) then
            replaceWithLongerPath( )
        else
            addNewPath( )
        end if
    end if {This is done for specialization}
    List lstshort = findShortestpathBetweenNodes(GI₁,GI₂)
    replaceShortestPath(lstshort)
end for
```

The algorithm for merging aggregation and composition relationship is same as the algorithm presented for the inheritance graph except for the input graphs representing aggregation and composition relationships.

USING Relationship

Merging graph of USING Relationship involves adding all the elements from input graphs to the resultant structure obtained after merging inheritance, aggregation and composition relationship. All associations representing USING relationship are preserved. While adding elements that have a USING relationship with $C_a$ there can be two kinds of discrepancies: (a) inconsistencies in attributes, or (b) inconstencies in associations.

Dealing with Inconsistencies when Merging Multiple Pruned Diagrams

An inconsistency in attributes occurs when there are two classes from different OCDs having the same name but different attributes. Inconsistency is resolved by aggregating the list of attributes in both classes into the resultant structure. In the student example given above, the class Registered Course has two attributes student id and course id in OCD, and has three attributes student id, course id and bill in $OCD_2$, the resultant class Registered Course will have three attributes student id, course id and bill.

The inconsistency in associations occurs when association between two nodes in $OCD_1$ is different in OCDs. If different associations exist between two nodes, all such associations are preserved. In ontology each association will be maintained as properties and multiple properties (first class elements) can exist. The final diagram obtained after merging inheritance, aggregation, composition and using associations gives the aggregated domain ontology with respect to $C_a$.

Re-Use of Ontology Diagrams

Consider a new software project. The software requirements will be given for the system to be built. These requirements are modeled as a sequence diagram describing the services provided by objects in the design through exchange of messages. The sequence is used to extract classes that are related to the requirement (environmental entities of interest).

Sequence diagrams acts as filters for extracting entities that are associated with a candidate class to achieve a particular functionality (use case) or to provide a service. Therefore, following Model Driven Architecture (MDA) principles, the program designer begins by describing the use cases functionalities/services from the functional requirements of a problem. By modeling these services into a set of sequence diagrams, ontology customizable for the new solution (i.e., a new project) can be used. This helps to obtain existing solution approaches for the new solution and thereby largely help software reuse.

Figure 21:
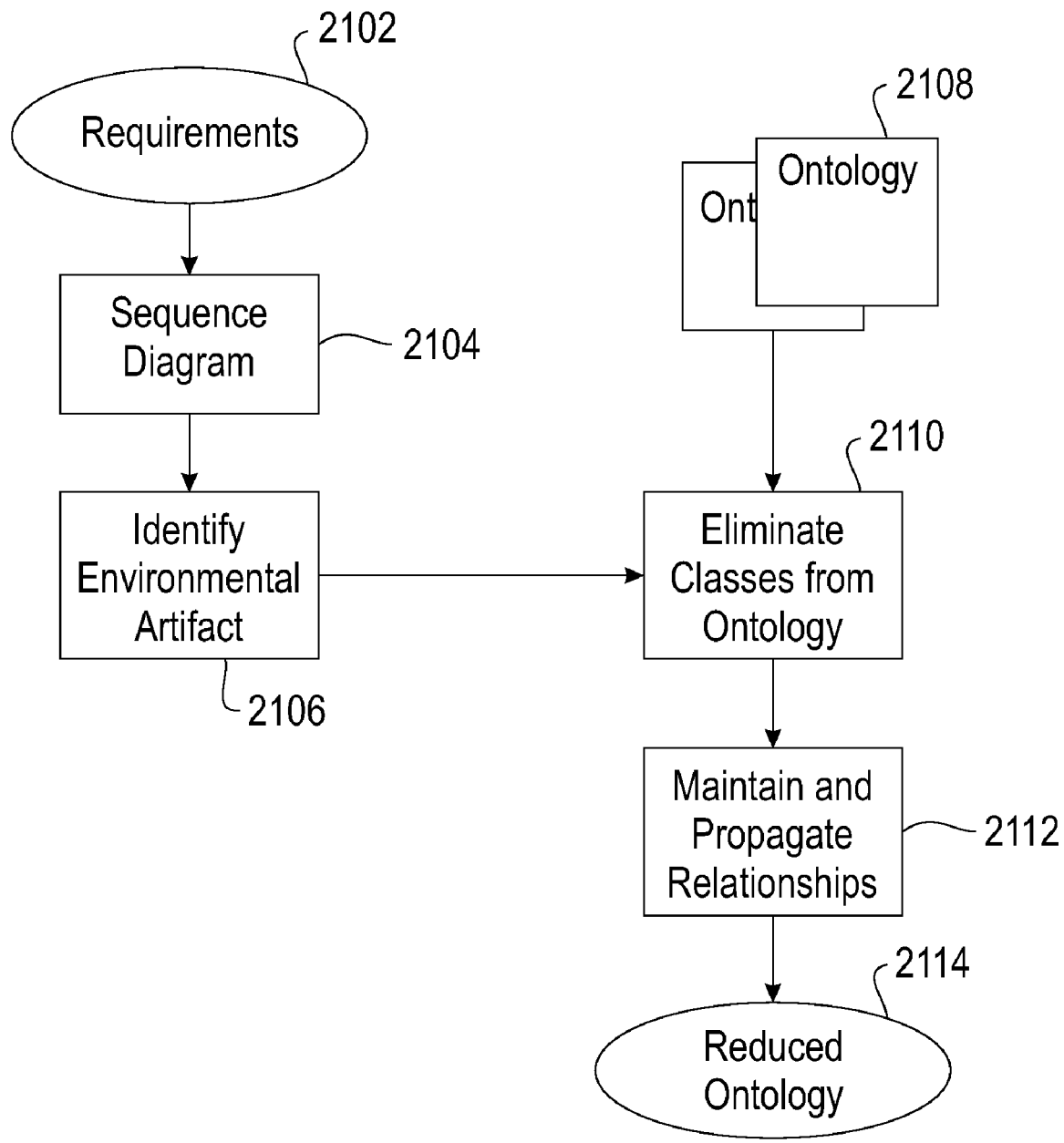
FIG. 21 is a schematic block diagram embodying another aspect of the invention.

Referring now to FIG. 21, a process 2100 for reuse of ontology diagram in a new software solution will be described. The process begins with a specification of design requirements 2102. The requirements are expressed as a sequence diagram in the step 2104. Next, in the step 2106, the environmental artifacts present in the sequence diagram are identified. An ontology diagram 2108 already exists and, in the step 2110, a subset of its concepts (classes) is selected which are also present in the sequence diagram 2106. Next, in step 2112, for all eliminated class level environmental artifacts, the relationship between dangling edges are propagated, as previously described. This results in a new ontology that forms the template for the design diagram 2114 for the design requirements 2102.

Computer Platform

Figure 22:
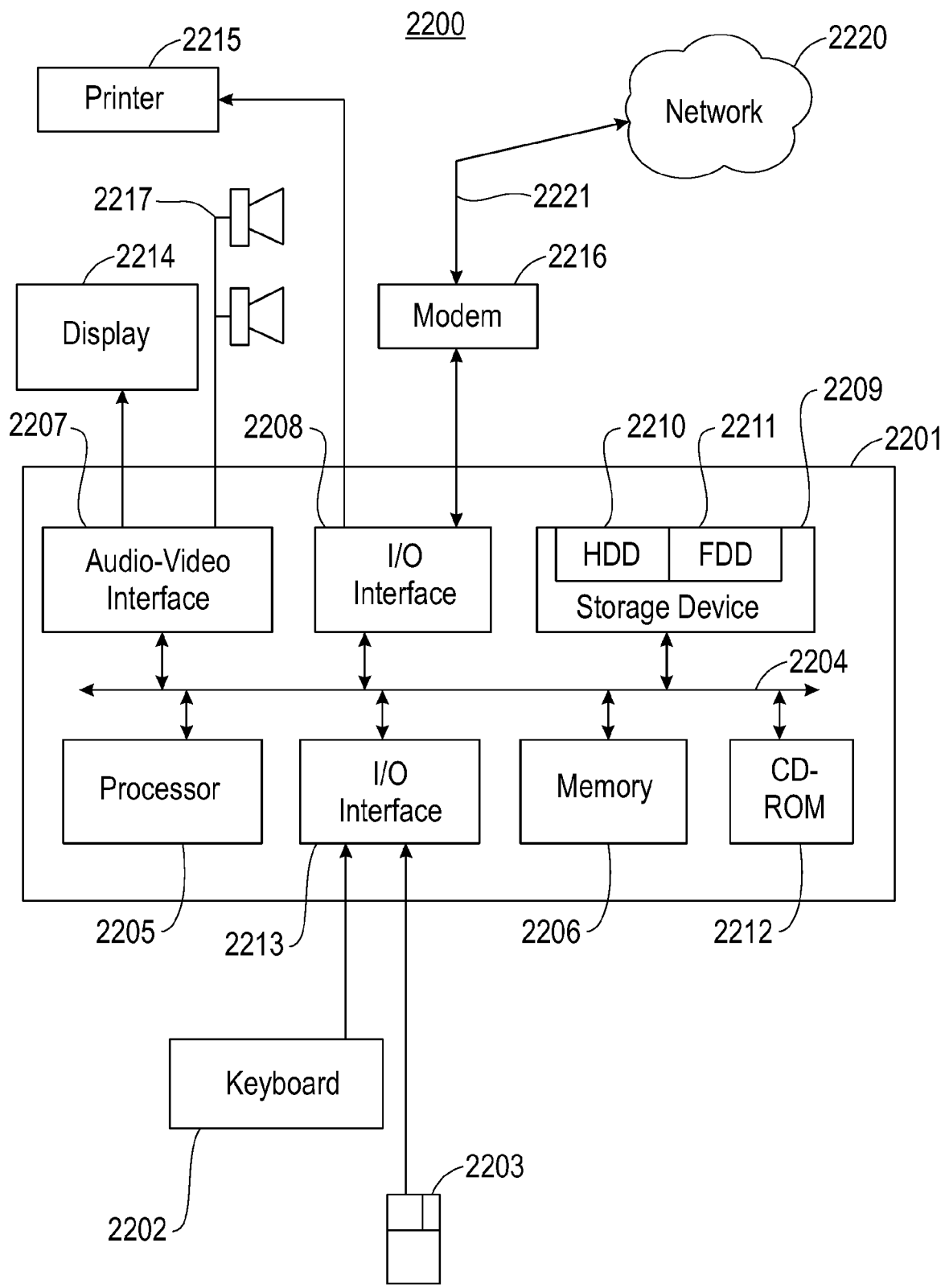
FIG. 22 is a schematic block diagram of a computer on which the invention can be implemented.

The methods of generating ontological information from design data and aggregating domain ontologies may be implemented using a computer system 2200, such as that shown in FIG. 22 wherein the processes of FIGS. 1 to 22 may be implemented as software, such as one or more application programs executable within the computer system 2200.

In particular, the steps of methods of generating ontological information from design data and aggregating domain ontologies are effected by instructions in the software that are carried out within the computer system 2200. The instructions may be formed as one or more code modules, each for performing one or more particular tasks. The software may also be divided into two separate parts, in which a first part (and the corresponding code modules) performs the ontological extraction methods and a second part (and the corresponding code modules) manage a user interface between the first part and the user. The software may be stored in a computer readable medium, including the storage devices described below, for example. The software is loaded into the computer system 2200 from the computer readable medium, and then executed by the computer system 2200. A computer readable medium having such software or computer program recorded on it is a computer program product. The use of the computer program product in the computer system 2200 preferably puts into effect an advantageous apparatus for generating ontological information from design data and aggregating domain ontologies.

As seen in FIG. 22, the computer system 2200 is formed by a computer module 2201, input devices such as a keyboard 2202 and a mouse pointer device 2203, and output devices including a printer 2215, a display device 2214 and loudspeakers 2217. An external Modulator-Demodulator (Modem) transceiver device 2216 may be used by the computer module 2201 for communicating to and from a communications network 2220 via a connection 2221. The network 2220 may be a wide-area network (WAN), such as the Internet or a private WAN. Where the connection 2221 is a telephone line, the modem 2216 may be a traditional "dial-up" modem. Alternatively, where the connection 2221 is a high capacity (eg: cable) connection, the modem 2216 may be a broadband modem. A wireless modem may also be used for wireless connection to the network 2220.

The computer module 2201 typically includes at least one processor unit 2205, and a memory unit 2206 for example formed from semiconductor random access memory (RAM) and read only memory (ROM). The module 2201 also includes an number of input/output (I/O) interfaces including an audio-video interface 2207 that couples to the video display 2214 and loudspeakers 2217, an I/O interface 2213 for the keyboard 2202 and mouse 2203 and optionally a joystick (not illustrated), and an interface 2208 for the external modem 2216 and printer 2215. In some implementations, the modem 2216 may be incorporated within the computer module 2201, for example within the interface 2208. The interface 2208 may be formed by an Ethernet™ circuit card, a wireless Bluetooth™ or an IEEE 802.11 wireless arrangement. The interfaces 2208 and 2213 may afford both serial and parallel connectivity, the former typically being implemented according to the Universal Serial Bus (USB) standards and having corresponding USB connectors (not illustrated). Storage devices 2209 are provided and typically include a hard disk drive (HDD) 2210. Other devices such as a floppy disk drive and a magnetic tape drive (not illustrated) may also be used. An optical disk drive 2212 is typically provided to act as a non-volatile source of data. Portable memory devices, such optical disks (eg: CD-ROM, DVD), USB-RAM, and floppy disks for example may then be used as appropriate sources of data to the system 2200.

The components 2205 to 2213 of the computer module 2201 typically communicate via an interconnected bus 2204 and in a manner which results in a conventional mode of operation of the computer system 2200 known to those in the relevant art. Examples of computers on which the described arrangements can be practiced include IBM-PCs and compatibles, Sun Sparcstations, Apple Mac™ or similar computer systems evolved there from.

Typically, the application programs discussed above are resident on the hard disk drive 2210 and read and controlled in execution by the processor 2205. Intermediate storage of such programs and any data fetched from the network 2220 may be accomplished using the semiconductor memory 2206, possibly in concert with the hard disk drive 2210. In some instances, the application programs may be supplied to the user encoded on one or more CD-ROM and read via the corresponding drive 2212, or alternatively may be read by the user from the networks 2220. Still further, the software can also be loaded into the computer system 2200 from other computer readable media. Computer readable media refers to any storage medium that participates in providing instructions and/or data to the computer system 2200 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 2201. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 2214. Through manipulation of the keyboard 2202 and the mouse 2203, a user of the computer system 2200 and the application may manipulate the interface to provide controlling commands and/or input to the applications associated with the GUI(s).

We claim:

1. A computer-implemented method for generating ontological information from design data, said design data having a plurality of classes, said classes having at least one association with another class, said method comprising:

processing, by a computer, said design data on the basis of rules to identify environmental artifacts;

processing, by said computer, said design data on the basis of rules to identify implementation artifacts;

eliminating, by said computer, from said design data all classes that are implementation artifacts;

establishing, by said computer, new associations for non-eliminated design data that have broken class associations as a result of said elimination; and processing, by said computer, said design data remaining following said elimination to preserve environmental artifact relationships between said retained classes to generate an ontology.

2. The method of claim 1, said design data comprising UML design data, and said design data having: a plurality of classes, each said class having at least one association with another class, and each said association having at least one attribute; and a sequence of execution of said classes.

3. The method of claim 2, further comprising:
processing said plurality of classes to identify classes having an implementation artifact, and eliminating such classes from said plurality of classes;
creating a new association for non-eliminated classes having a dangling association as a result of the elimination from said plurality of classes; and
processing said newly associated design data with said sequence of execution to preserve environmental relationships.

4. The method of claim 3, said implementation artifact being one of a controller class and a boundary class.

5. The method of claim 3, said processing to preserve environmental relationships including at least one of:
maintaining relationships between a class with said ancestors and descendants;
maintaining aggregation and composition relationships between a class having a PART-OF relationship with another class; and
maintaining directional associations between a class having a USING relationship with another class.

6. The method of claim 3, said new associations being created by identifying propagating edges of disconnected nodes in a class, and forming a new edge having the attributes of role, cardinality, and direction.

7. The method of claim 3, further comprising merging at least two sets of said ontological information subject to an ontology requirement.

8. A computer system for generating ontological information from design data, said design data having a plurality of classes, said classes having at least one association with another class, said system comprising:
a memory that stores; and
a processor that
processes said design data on the basis of rules to identify environmental artifacts;
processes said design data on the basis of rules to identify implementation artifacts;
eliminates from said design data all classes that are implementation artifacts;
establishes new associations for non-eliminated design data that have broken class associations as a result of said elimination; and
processes said design data remaining following said elimination to preserve environmental artifact relationships between said retained classes to generate an ontology.

9. The system of claim 8, said design data for generating ontological information including UML design data, said design data having: a plurality of classes, each said class having at least one association with another class, and each said association having at least one attribute; and a sequence of execution of said classes.

10. The system of claim 9, said processor further:
processing said class data to identify classes having an implementation artifact, and eliminating such classes from said class data;
creating a new association for non-eliminated classes having a dangling association as a result of the elimination of class data; and
processing said newly associated design data with said sequence of execution data to preserve environmental relationships.

11. The system of claim 10, said implementation artifacts being controller and boundary class data.

12. The system of claim 10, said process to preserve environmental relationships including at least one of:
maintaining relationships between a class with said ancestors and descendants;
maintaining aggregation and composition relationships between a class having a PART-OF relationship with another class; and
maintaining directional associations between a class having a USING relationship with another class.

13. The system of claim 10, said new associations being created by identifying propagating edges of disconnected nodes in a class, and forming a new edge having the attributes of role, cardinality, and direction.

14. The system of claim 10, further comprising merging at least two sets of said ontological information subject to an ontology requirement.

15. A computer-implemented method for generating new design data based on ontological information from previous design data, said previous design data having a plurality of classes, said classes having at least one association with another class, said method comprising:
processing, by a computer, said previous design data on the basis of rules to identify environmental artifacts;
processing, by said computer, said previous design data on the basis of rules to identify classes having an implementation artifact;
eliminating, by said computer, from said previous design data all classes having an implementation artifact;
establishing, by said computer, new associations for non-eliminated design data that have broken class associations as a result of said elimination;
processing, by said computer, said previous design data remaining following said elimination to preserve environmental artifact relationships between said retained classes to generate an ontology;
inputting, by said computer, new design requirements data;
identifying, by said computer, environmental artifacts in new design requirements data;
applying, by said computer, said ontology to said environmental artifacts; and
maintaining and propagating, by said computer, relationships between environmental artifacts after elimination of the implementation artifact to generate a reduce ontology to serve as a template for new design data.

16. A computer-implemented method for generating new design data for a new software project based on ontological information from previous design data, said previous design data having a plurality of classes, said classes having at least one association with another class, said method comprising:
inputting, by a computer, a sequence diagram for said new project;
eliminating, by said computer, from said existing ontology environmental classes which are not part of said sequence diagram to generate a reduced ontology;
establishing, by said computer, new relationships for non-eliminated entities in said reduced ontology that have broken relationships as a result of said elimination; and
processing said reduced, by said computer, ontology following said elimination to preserve environmental artifact relationships between said retained classes to generate a new ontology specific to said new project.

* * * * *